(12) United States Patent
Cotting et al.

(10) Patent No.: US 6,423,378 B1
(45) Date of Patent: Jul. 23, 2002

(54) USE OF SILICONE COMPOSITIONS CROSS-LINKABLE BY CATIONIC PROCESS UNDER UV RADIATION AND OF AN ONIUM BORATE TYPE PHOTOINITIATOR FOR COATING FLAT JOINTS, PARTICULARLY CYLINDER HEAD GASKETS

(75) Inventors: Marie-Christine Cotting, Bron; Gérard Joubert, Pont-Eveque; Olivier Loubet, Lyons, all of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/331,783

(22) PCT Filed: Dec. 29, 1997

(86) PCT No.: PCT/FR97/02443

§ 371 (c)(1),
(2), (4) Date: Aug. 30, 1999

(87) PCT Pub. No.: WO98/29498

PCT Pub. Date: Jul. 9, 1998

(30) Foreign Application Priority Data

Dec. 30, 1996 (FR) ............................................. 96 16378

(51) Int. Cl.⁷ .............................. B05D 3/06; C08F 2/50
(52) U.S. Cl. ...................... 427/387; 427/515; 427/517; 522/25; 522/26; 522/27; 522/31; 522/65; 522/66; 522/67; 522/68; 522/99; 528/13; 528/19; 528/21; 528/23; 528/32; 528/37
(58) Field of Search .................................. 427/387, 515, 427/517; 522/25, 26, 27, 31, 66, 99, 65, 67, 68; 528/13, 19, 21, 23, 32, 37

(56) References Cited

U.S. PATENT DOCUMENTS 4,499,135 A * 2/1985 Mitchell et al. ............. 428/137
5,340,898 A * 8/1994 Cavezzan et al. ............. 528/19
5,693,688 A * 12/1997 Priou ............................ 522/25
5,703,137 A * 12/1997 Priou et al. ..................... 522/25
5,866,261 A * 2/1999 Kerr, III et al. ............. 428/447

FOREIGN PATENT DOCUMENTS

| EP | 0 539 234 | 4/1993 | ............ C08L/83/06 |
| EP | 0 562 922 | 9/1993 | ......... C09D/183/06 |
| EP | 0 614 958 | 1/1994 | ......... C09D/183/06 |
| EP | 0 703 236 | 3/1996 | ............. C07F/5/02 |
| FR | 2 727 416 | 5/1996 | ............. C08F/4/52 |

OTHER PUBLICATIONS

DE 3718559, Dec. 1988, Giesen et al., Derwent abstract.*
DE 3731032, Mar. 1989, Giesen et al., Derwent abstract.*
EP 471979, Feb. 1992, Kirchenamann et al. Derwent Abstract.*

* cited by examiner

*Primary Examiner*—Robert Dawson
*Assistant Examiner*—Jeffrey B Robertson

(57) ABSTRACT

The invention concerns the use of cross-linkable silicone compositions for fast, economical and simple impregnation and/or varnishing of flat joints (e.g. cylinder head gaskets). More precisely it concerns the use of silicone compositions cross-linkable under UV radiation, by cationic process and in the presence of specific phoinitiators selected among onium borates or organometallic complexes, of which the borate counter-anions contain at least a boron bound to at least a substituted phenyl (Me, F). The silicone liquid precursor is a polydimethylsiloxane (PDMS) substituted by cross-linking functional groups, by cationic process ($G_{fp}$) under UV of the epoxy of vinyloxy type. These $G_{fp}$ are present at the rate of 0.15 to 2.0 pr kg of PDMS. The invention also relates to the method for impregnating/varnishing flat joints (e.g. cylinder head gaskets) using the specific PDMS composition+photoinitiator of borate type as well as the treated joints and the composition themselves.

13 Claims, 3 Drawing Sheets

USE OF SILICONE COMPOSITIONS CROSS-LINKABLE BY CATIONIC PROCESS UNDER UV RADIATION AND OF AN ONIUM BORATE TYPE PHOTOINITIATOR FOR COATING FLAT JOINTS, PARTICULARLY CYLINDER HEAD GASKETS

This application is an application under 35 U.S.C. Section 371 of International Application Number PCT/FR97/02443, filed on Dec. 29, 1997.

The area of the present invention is that of silicone compositions based on organofunctional polyorganosiloxanes (POS) crosslinkable by the cationic route under the effect of activation obtained via light radiation, preferably UV radiation, and/or via an electron beam and/or via thermal energy.

More specifically, the invention relates to the use of such compositions for the treatment of sheet gaskets, in particular for impregnating or varnishing cylinder head gaskets of internal combustion engines.

It relates in particular, using these compositions crosslinkable by the cationic route under UV radiation, e.g., to impregnating sheet gaskets (cylinder head gaskets) and/or to preparing antiadhesive coatings at the engine block/cylinder head interface of heat engines, the said interface preferably being the cylinder head gasket itself.

The silicone compositions used for this purpose were not until now silicone compositions crosslinkable by the cationic route under UV radiation.

The functioning of an internal combustion engine requires strong cohesion of the stationary components, thorough lubrication of the moving components and efficient cooling of the engine block assembly. The cylinder head gasket has a two-fold role; it provides for the cohesion of the engine block/cylinder head dismountable assembly and for the leaktightness of the intersecting circulations of the cooling liquid (water to which glycol and alkaline agents have been added), oil and gases in the course of combustion.

Cylinder head gaskets can be made of highly complex composite materials comprising a metal core made of finely perforated sheet metal, a board (preferably devoid of asbestos) composed of organic fibres and of inorganic fillers, crimped firing rings opening on the explosion chamber, and a kerb made of silicone elastomer to contain possible leaks onto the surface.

Cylinder head gaskets can also be composed simply of one or more metal sheets optionally covered with an NBR rubber elastomer coating or fluorinated elastomer coating of the Viton type (cf., for example, JP-A-082 09 113).

Cylinder head gaskets are generally subjected, prior to their use, to two types of treatment using silicones:

1—an impregnation treatment intended to fill the voids in order to render the board water-repellent and to improve its thermal behaviour, 2—and a varnishing treatment intended to lower the coefficient of friction of the gasket and to bring about good antiadhesiveness.

In addition to these treatments, a kerb made of silicone elastomer is also deposited, by silk-screen printing, on cylinder head gaskets.

The impregnation of cylinder head gaskets with crosslinked silicones is recommended in the case where the support is porous. This makes it possible to ensure leaktightness with regard to the various operating fluids of the engine (oils, petrol, fuel oil, cooling liquid or combustion gases). Furthermore, the impregnation provides the gasket with a degree of compressibility which it has to have during the flattening to which it is subjected when the cylinder head is tightened.

When the cylinder head is taken off, the gasket must be removed very easily without adhering to the surfaces of the cylinder head. It is therefore essential for both faces of the gasket to be antiadhesive and this is one of the essential roles of the varnishing by crosslinked silicone compositions. Varnishing with the silicone contributes to rendering leak-proof but also to protecting the gasket with respect to possible damage during the operation of the engine (mechanical stress: thermal stress and/or shearing: heating/cooling).

The impregnating agents and varnishes conventionally used are compositions composed of silicone oils or resins of low viscosity comprising SiOH or SiH functional groups (U.S. Pat. No. 4,720,316; EP-A-272,282) or SiVinyl functional groups (DE-A-3,731,032; U.S. Pat. No. 4,499,135) or of mixtures of a silicone oil or resin comprising SiH functional groups and of a silicone oil or resin comprising SiVinyl functional groups (DE-A-3,718,599; EP-A-471,979; DE-A-3,544,740) capable of crosslinking at high temperature (generally greater than 100° C.) in the presence of a metal catalyst, such as tin, titanium, sirconium or platinum salts, or of a peroxide.

Compositions based on silicone oils or resins comprising SiOH, SiH, SiVinyl or SiH/SiVinyl functional groups generating exhibit at least one of the following disadvantages:

the mixture composed of the silicone matrix and the catalyst is unstable at ambient temperature (in particular in the absence of solvent), this instability being reflected by an increase in viscosity, indeed even by a gelling, of the impregnation or varnishing bath, which requires frequent replacement of the impregnation or varnishing bath or treatment in two stages; for example, Patents U.S. Pat. No. 4,720,316 and EP-A-272,382 recommend the use of the catalyst during the manufacture of the board and then impregnation of the dried board with a silicone oil possessing SiH groups;

it is often necessary to disperse the silicone+catalyst mixture in an organic solvent in order to increase the stability and to decrease the viscosity of the said mixture; this results in the disadvantages related to the use of solvents (toxicity, provision of safety devices, of devices for recycling the solvent, and the like)

the cost price of the starting materials is high, in particular in the case of vinylated oils or resins optionally used in combination with oils or resins possessing SiH functional groups and with a platinum catalyst; these mixtures can be very stable at ambient temperature, in particular in the presence of a platinum inhibitor, but are expensive because of the use of vinylated oils or resins.

In the quest for a novel silicone composition for the treatment of cylinder head gaskets having the object of improving the abovementioned known compositions (Rhône-Poulenc French patent application on cylinder head gaskets—U.S. Pat. No. 2,697,532), provision has been made to use a silicone composition crosslinkable by hydrosilylation comprising an α,ω-diOH POS, a POS possessing an SiH unit of the PMHS type, and ethynylcyclohexanol, the latter compound making it possible to form resins possessing a silanol functional group; the ratio of SiH to SiOH of the POS concerned being of the order of 10/1 to 30/1 and the composition also comprising a polyaddition catalyst of the Karstedt type.

Even if such a composition effectively leads to improvement with regard to stability, reactivity and flexibility of use, it still remains the case that the crosslinking specific to this type of composition comprises a restrictive stage of heating at high temperature (160° C.) for 5 to 10 minutes. Such a stage is particularly penalizing with regard to the productivity of an industrial process for the treatment or coating of cylinder head gaskets using silicones. It may thus be necessary, for example, to resort to the use of sophisticated and expensive equipment, such as long heating tunnels. It therefore seems that these silicone compositions, crosslinkable by polyaddition and used for the coating of cylinder head gaskets, still do not contribute an entirely satisfactory solution to the problem of carrying out silicone impregnation and treatment of cylinder head gaskets which meet the specifications of antiadhesiveness and of compressibility, as well as the requirements of productivity and of profitability for large scale production.

French Patent Application No. 2,722,203 relates to the application of a crosslinkable fluorosilicone coating to a cylinder head gasket. Such a coating is obtained from a silicone composition crosslinkable, under the effect of heat, of UV radiation or of an electron beam, by hydrosilylation. This composition comprises a vinylated fluorosilicone, a POS carrying SiH units, a platinum hydrosilylation catalyst, a condensation catalyst of the peroxide type and, optionally, a solvent of the halogenated solvent, ester or acetone type. The support to which this composition can be applied is described as preferably having a silicone nature. This coating is more specifically intended to reduce the impermeability with respect to oil of cylinder head gaskets. It is a relatively thick coating: 0.1–10 mm, which is characterized by a relatively long crosslinking time of several minutes and which has to be activated by heat for the crosslinking, even in the cases where UV radiation is used. This known coating is therefore not itself satisfactory either as regards the requirements related to large scale industrial production. Furthermore, the fact that the crosslinking of this fluorosilicone composition is based on an SiH/SiVi hydrosilylation mechanism poses problems of stability.

U.S. Pat. No. 5,260,348 also discloses a silicone composition crosslinkable under UV radiation according to a condensation mechanism. Such a composition is of use in the preparation of an antiadhesion coating (release coating), in particular for cylinder head gaskets. This composition comprises an $\alpha,\omega$-diOH POS of the polydimethylsiloxane or polydifluoroalkylsiloxane type, a crosslinking agent of the methyl- or ethyltriacetoxysilane or methyltribenzoxysilane type, and a photoinitiator formed by an onium (iodonium) salt, the counteranion of which is $BF_4^-$ or $SbF_6^-$. These silicone compositions crosslinkable under UV radiation by condensation have to be subjected to an additional thermal activation in order to obtain reasonable crosslinking times. It is obvious that this complicates the industrial process.

The counteranion with the best performance for crosslinking under UV radiation is $SbF_6^-$ but it is found that it exhibits the major disadvantage of being toxic.

It is therefore necessary to observe that, in the current state of the art, there does not exist a crosslinkable silicone composition entirely well suited to the requirements of the specific application, such as impregnation and/or coating of sheet gaskets and in particular cylinder head gaskets. The expected specifications for the impregnation and the varnishing of cylinder head gaskets, which are in particular the ability to render leaktight, the compressibility, the antiadhesiveness, the stability and the ease of use and of preparation, are not satisified by the crosslinkable silicone compositions known to date.

In this state of knowledge, one of the essential objects of the present invention is to reveal a crosslinkable silicone composition for the impregnation and the varnishing of sheet gaskets, in particular of cylinder head gaskets, which overcomes the deficiencies of the prior art and in particular which offer a process for the application and for the preparation/crosslinking of the silicone coating which is fast, which does not require sophisticated equipment or high temperatures, and which makes it possible to obtain a sufficiently antiadhesive varnishing coating possessing suitable mechanical properties.

Another essential object of the present invention is to find a crosslinkable silicone composition for the impregnation and/or the varnishing of sheet gaskets, in particular of cylinder head gaskets, which is stable on storage, which is economical and which does not involve toxic solvents.

Another object of the present invention is to provide a process for the coating of a sheet gasket, in particular of a cylinder head gasket, by impregnation and/or varnishing using a crosslinkable silicone composition, this process having to be easy to employ, to be economical and fast, and to result in a silicone-comprising cylinder head gasket which is antiadhesive and which performs well in the surroundings in which it is used.

Another essential object of the present invention is to provide a sheet gasket and in particular a cylinder head gasket coated and/or impregnated with an antiadhesive and compressible crosslinked silicone exhibiting all the expected specifications set out above as regards "processibility" and intrinsic qualities of the material.

Once these objects have been set, it is to the credit of the Applicant Company to have found, after many studies and experiments, that, entirely surprisingly and unexpectedly, it is appropriate to select silicone compositions crosslinkable by the cationic route, preferably under activation by UV radiation, in which the initiator is an onium borate and/or a borate of organometallic cations having the distinguishing feature of having a borate counteranion of an entirely specific nature, in particular in that it comprises a borate atom bonded to at least one phenyl radical substituted by at least one electron-withdrawing group. In addition to this advantageous selection of the initiator, the Applicant Company has isolated a class of POS carrying organofunctional bridging groups ($G_{fp}$) crosslinkable by the cationic route, for example of epoxide or vinyl ether type, in which compounds these $G_{fp}$ groups are present in an amount of at least 0.01 equivalent per kg of POS.

Thus it is that the present invention relates to the use:

for carrying out impregnation(s) and/or for preparing coating(s) which is (are) antiadhesive employed at the engine block cylinder head interface of engines and applied to sheet gaskets, in particular cylinder head gaskets, of compositions based on at least one polyorganosiloxane (POS) crosslinkable by the cationic route, preferably under UV radiation, and on an effective catalytic amount of at least one initiator salt (PI), the said use being characterized in that:

(i) the initator salt (PI) is formed by at least one borate of an onium of an element from Groups 15 to 17 of the Periodic Classification [Chem. & Eng. New, Vol. 63, No. 5, 26 of Feb. 4, 1985] or of an organometallic complex of an element from Groups 4 to 10 of the Periodic Classification (same reference), ☐ the cationic entity of the said borate being chosen from:

1)—onium cations of the formula (I):

in which formula:
- A represents an element from Groups 15 to 17, such as, for example, I, S, Se, P of N,
- $R^1$ represents a $C_6$–$C_{20}$ carbocyclic or heterocyclic aryl radical, it being possible for the said heterocyclic radical to comprise nitrogen or sulphur as heteroelements,
- $R^2$ represents $R^1$ or a linear or branched $C_1$–$C_{30}$ alkyl or alkenyl radical; the said $R^1$ and $R^2$ radicals optionally being substituted by a $C_1$–$C_{25}$ alkoxy, $C_1$–$C_{25}$ alkyl, nitro, chloro, bromo, cyano, carboxy, ester or mercapto group,
- n is an integer ranging from 1 to v+1, v being the valency of the element a,
- m is an integer ranging from 0 to v−1, with n+m=v+1, 2)—the oxoisothiochromanium cations disclosed in Patent Application WO 90/11303, in particular the sulphonium cation of 2-ethyl-4-oxoisothiochromanium or of 2-dodecyl-4-oxoisothiochromanium;

3)—sulphonium cations where the cationic entity comprises:
3.1. at least one polysulphonium species of formula III.1

$$Ar^1 \!-\! \overset{+}{\underset{Ar^2}{S}} \!-\! Ar^3 \!-\! Y \!-\! \left[ Ar^3 \!-\! \overset{+}{\underset{Ar^2}{S}} \!-\! Ar^1 \right]_t \tag{III.1}$$

in which:
- the $Ar^1$ symbols, which can be identical to or different from one another, each represent a monovalent phenyl or naphthyl radical optionally substituted with one or more radicals chosen from; a linear or branched $C_1$–$C_{12}$, preferably $C_1$–$C_6$, alkyl radical, a linear or branched $C_1$–$C_{12}$, preferably $C_1$–$C_6$, alkoxy radical, a halogen atom, an —OH group, a —COOH group, a —COO-alkyl ester group, where the alkyl part is a linear or branched $C_1$–$C_{12}$, preferably $C_1$–$C_6$, residue, and a group of formual —$Y^4$—$Ar^2$, where the $Y^4$ and $Ar^2$ symbols have the meaning given immediately below,
- the $Ar^2$ symbols, which can be identical to or different from one another or $Ar^1$, each represent a monovalent phenyl or naphthyl radical optionally substituted with one or more radicals chosen from: a linear or branched $C_1$–$C_{12}$, preferably $C_1$–$C_6$, alkyl radical, a linear or branched $C_1$–$C_{12}$, preferably $C_1$–$C_6$, alkoxy radical, a halogen atom, an —OH group, a —COOH group or a —COO—alkyl ester group, where the alkyl part is a linear or branched $C_1$–$C_{12}$, preferably $C_1$–$C_6$, residue,
- the $Ar^3$ symbols, which can be identical to or different from one another, each represent a divalent phenylene or naphthylene radical optionally substituted with one or more radicals chosen from: a linear or branched $C_1$–$C_{12}$, preferably $C_1$–$C_6$, alkyl radical, a linear or branched $C_1$–$C_{12}$, preferably $C_1$–$C_6$, alkoxy radical, a halogen atom, an —OH group, a —COOH group or a —COO—alkyl ester group, where the alkyl part is a linear or branched $C_1$–$C_{12}$, preferably $C_1$–$C_6$, residue,
- t is an integer equal to 0 or 1, with the additional conditions according to which:
when t=0, the Y symbol is then a $Y^1$ monovalent radical representing the group of formula:

$$Y^1: \quad -\overset{+}{\underset{Ar^2}{S}}-Ar^1$$

where the $Ar^1$ and $Ar^2$ symbols have the meanings given above, when t=1:
on the one hand, the Y symbol is then a divalent radical having the following meanings $Y^2$ to $Y^4$:
$Y^2$: a group of formula:

$$-\overset{+}{\underset{Ar^2}{S}}-$$

where the $Ar^2$ symbol has the meanings given above,
$Y^3$: a single valency bond,
$Y^4$: a divalent residue chosen from:

$$-O-, \quad -S-, \quad -\overset{\downarrow}{\underset{O}{S}}-, \quad -\overset{\|}{\underset{O}{C}}-.$$

a linear $C_1$–$C_{12}$ alkylene residue, a branched $C_1C_{12}$ alkylene residue and a residue of formula —$Si(CH_3)_2O$—, on the other hand, solely in the case where the Y symbol represents $Y^3$ or $Y^4$, the $Ar^1$ and $Ar^2$ (terminal) radicals have, in addition to the meanings given above, the possibility of being connected to one another via the Y' residue consisting of $Y'^1$, a single valency bond, or of $Y'^2$, a divalent residue chosen from the residue cited with respect to the definition of $Y^4$, which is inserted between the carbon atoms, facing each other, situated on each aromatic ring in the ortho position with respect to the carbon atom directly bonded to the $S^+$ cation;

3.2. and/or at least one monosulphonium species having a single $S^+$ cation centre per mole of cation and comprising, in the majority of cases, species of formula:

$$Ar^1 \!-\! \overset{+}{\underset{Ar^2}{S}} \!-\! Ar^1 \tag{III.2}$$

in which $Ar^1$ and $Ar^2$ have the meanings given above with respect to the formula (III.1), including the possibility of connecting directly between them only one of the $Ar^1$ radicals to $Ar^2$ according to the way indicated above with respect to the definition of the additional condition in force when t=1 in the formula (II) involving the Y' residue;

4)—organometallic cations of formula (IV):

$$(L^1L^2L^3M)q^+ \tag{IV}$$

in which formula:
- M represents a metal from group 4 to 10, in particular iron, manganese, chromium or cobalt,
- $L^1$ represents a ligand bonded to the metal M via $\pi$ electrons, which ligand is chosen from $\eta^3$-alkyl, $\eta^5$-cyclopentadienyl and $\eta^7$-cycloheptatrienyl ligands and $\eta^6$- aromatic compounds chosen from optionally substituted $\eta^6$-benzene ligands and compounds having from 2 to 4 condensed rings, each ring being capable of contributing to the valency layer of the metal M via 3 to 8 $\pi$ electrons, L² represents a ligand bonded to the metal M via π electrons, which ligand is chosen from η⁷-cycloheptatrienyl ligands and η⁶-aromatic compounds chosen from optionally substituted η⁶-benzene ligands and compounds having from 2 to 4 condensed rings, each ring being capable of contributing to the valency layer of the metal M via 6 or 7 π electrons, L³ represents from 0 to 3 identical or different ligands bonded to the metal M via σ electrons, which ligand (s) is (are) chosen from CO and $NO_2^+$; the total electronic charge q of the complex to which L¹, L² and L³ and the ionic charge of the metal M contribute being positive and equal to 1 or 2;

the anionic entity of the said borate having the formula:

$[BX_aR_b]^-$ in which formula:
a and b are integers ranging from 0 to 3 for a and from 1 to 4 for b, with a+b=4,
the x symbols represent:
  a halogen atom (chorine or fluorine) with a=0 to 3,
  an OH functional group with a=0 to 2,
the R symbols are identical or different and represent:
  a phenyl radical substituted by at least one electron-withdrawing group, such as, for example, $OCF_3$, $CF_3$, $NO_2$ or CN, and/or by at least 2 halogen atoms (very particularly fluorine), this being when the cationic entity is an onium of an element from groups 15 to 17,
  a pheny radical substituted by at least one electron-withdrawing element or group, in particular a halogen atom (very particularly fluorine), $CF_3$, $OCF_3$, $NO_2$ or CN, this being when the cationic entity is an organometallic complex of an element from groups 4 to 10,
  an aryl radical comprising at least two aromatic nuclei, such as, for example, biphenyl or naphthyl, which is optionally substituted by at least one electron-withdrawing element or group, in particular a halogen atom (very particularly fluorine), $OCF_3$, $CF_3$, $NO_2$ or CN, whatever the cationic entity;

(2i) the POS comprises at least one monomer and/or one oligomer and/or one polymer selected:
from compounds comprising at least one (organo) functional bridging group crosslinkable by the cationic route ($G_{fp}$) with a heterocyclic nature having one or more electron-donating atoms, such as O, S, N and P, and/or from those comprising at least one ethylenically unsaturated $G_{fp}$ group which is substituted by at least one electron-donating atom which increases the basicity of the π system, epoxidized POSs and/or POSs carrying vinyl ether groups being particularly preferred as $G_{fp}$, and (3i) the $G_{fp}$s are present in a proportion (expressed in eq per kg of POS) of at least 0.01, preferably at least 0.10, and more preferably still in a proportion of 0.15 to 2.00.

The present invention therefore proceeds from a novel and inventive advantageous selection of a specific class of silicone compositions crosslinkable by the cationic route, preferably under UV radiation, which is marked out by the nature of its (photo)initiator of the onium borate or borate of organometallic cations type with a borate counteranion of the borophenyl substituted by electron-withdrawing, for example fluorianted, groups type, as well as by a specific POS exhibiting an appropriate level of $G_{fp}$ functional bridging groups.

Such a selection gives access to an entire series of attractive advantages, namely in particular:

the excellent stability (pot life) of the composition, the change in the viscosity of the latter remaining slight despite the presence of the initiator for several days, indeed even several months, after preparing the composition, provided that the latter is stored with light excluded;

a very good reactivity at ambient temperature;

a low cost price due to the low cost of the starting materials and to the simplicity of the application/crosslinking process for impregnation and/or varnishing;

good flexibility of use, it being possible for the reactivity, the stability, the viscosity and the coefficient of friction of the varnish of the impregnating agent or of the varnish which is non-crosslinked to be easily varied, to a large extent, by varying:
  the molor mass of the POS oil carrying $G_{fp}$,
  the concentration of initiator,
  as well as the $G_{fp}$/POS molar ratio;

a coating process for the impregnation and/or the varnishing which is simple to employ, which is fast and which does not require sophisticated and expensive equipment and which is therefore, ultimately, productive and profitable;

no need to resort to toxic products in the composition.

It should also be noted that the varnishes or the impregnations obtained on sheet gaskets, in particular on cylinder head gaskets, exhibit a beautiful appearance (absence of bubbles) and satisfy the required qualities of antiadesiveness, of leaktightness and of compressibility. Furthermore, the varnish and/or the impregnating agent which is crosslinked has good mechanical properties, resistance to abrasion as well as thermal behaviour, behaviour towards oils and more generally behaviour towards aggressive products, such as the cooling liquid, which are entirely satisfactory.

-continued

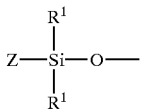

(VI)

Figure 1:
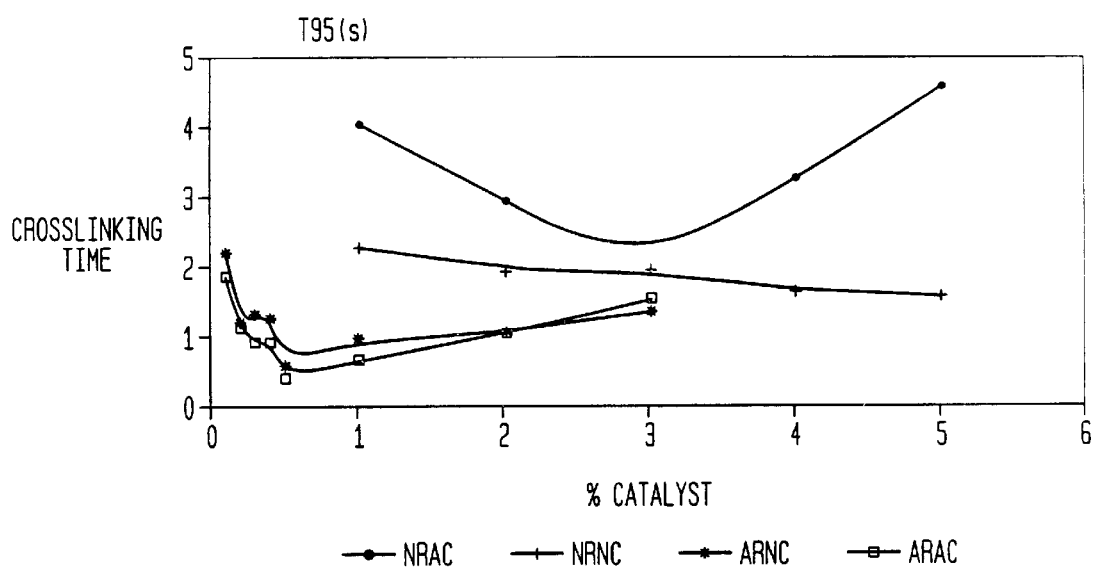
FIG. 1 represents the time at which 95% (T95) of resin has crosslinked in relation with the amount of catalyst.
Figure 2:
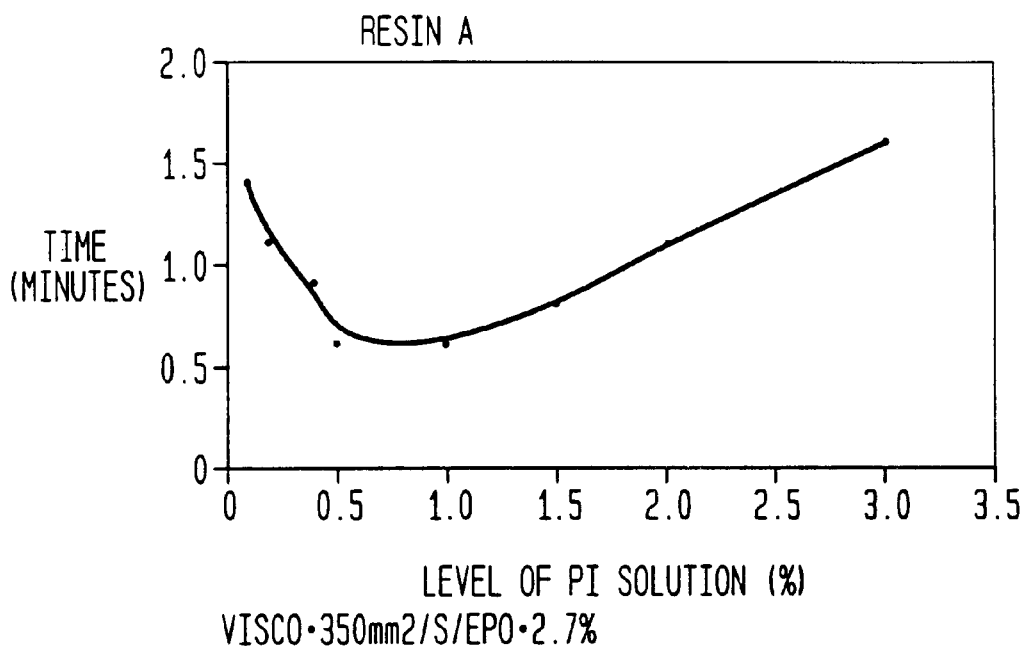
FIGS. 2 to 5 represent the time at which 95% (T95) of respectively four different resins A to D has crosslinked in relation with the amount of initiator, According to a preferred arrangement of the invention, the POS employed exhibits $G_{fp}$s of the epoxide and/or vinyl ether type and is selected from the POSs which are:
either linear or substantially linear and composed of units of formula (V), terminated by units of formula (VI),
or cyclic and composed of units of formula (V)
Figure 3:
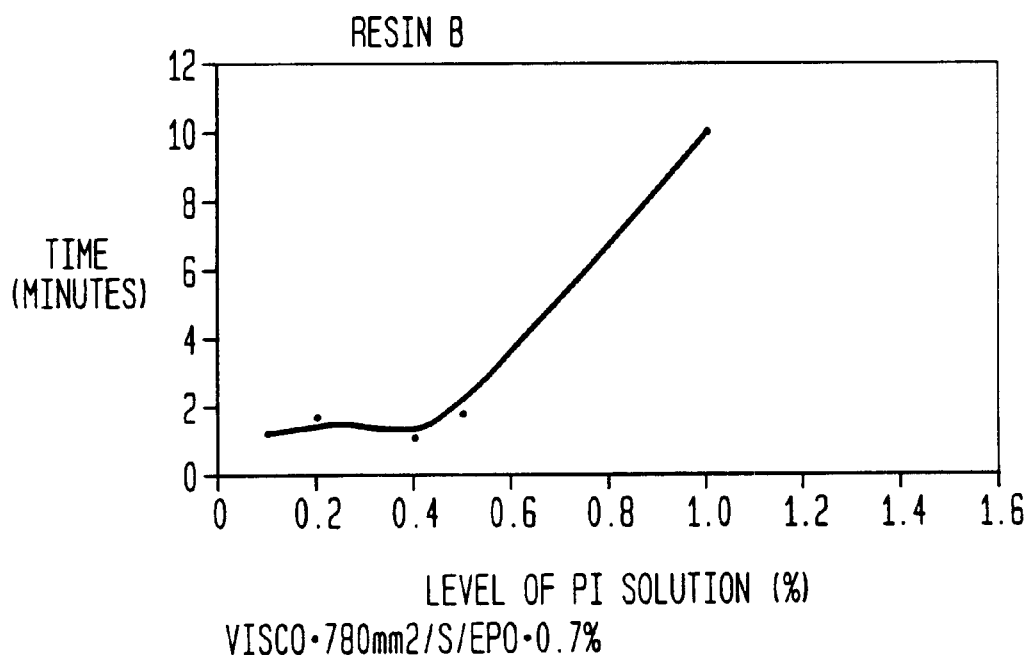
Figure 4:
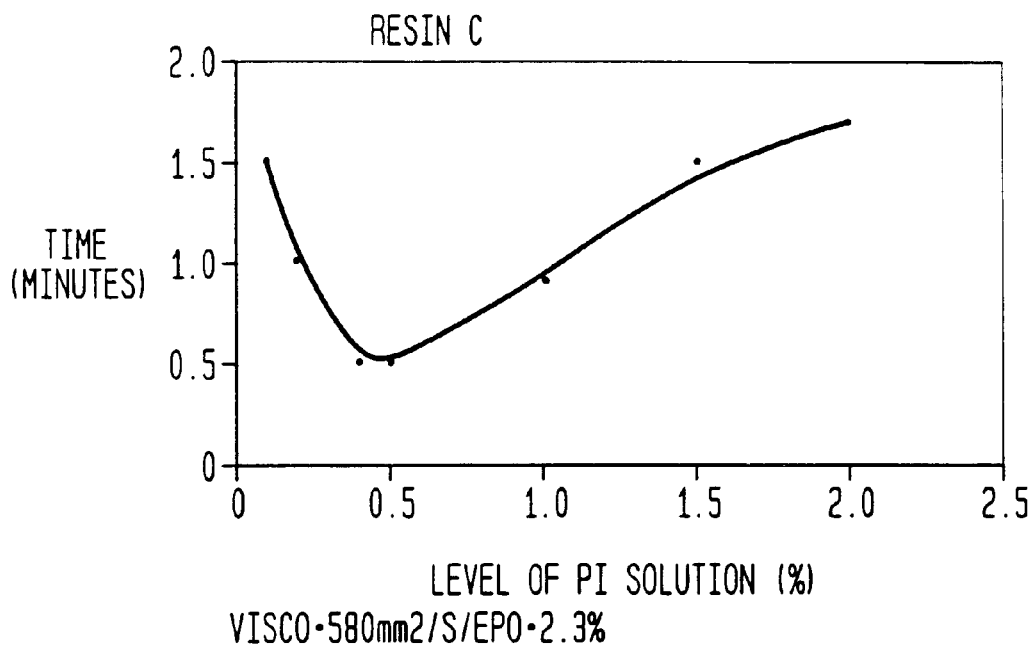
Figure 5:
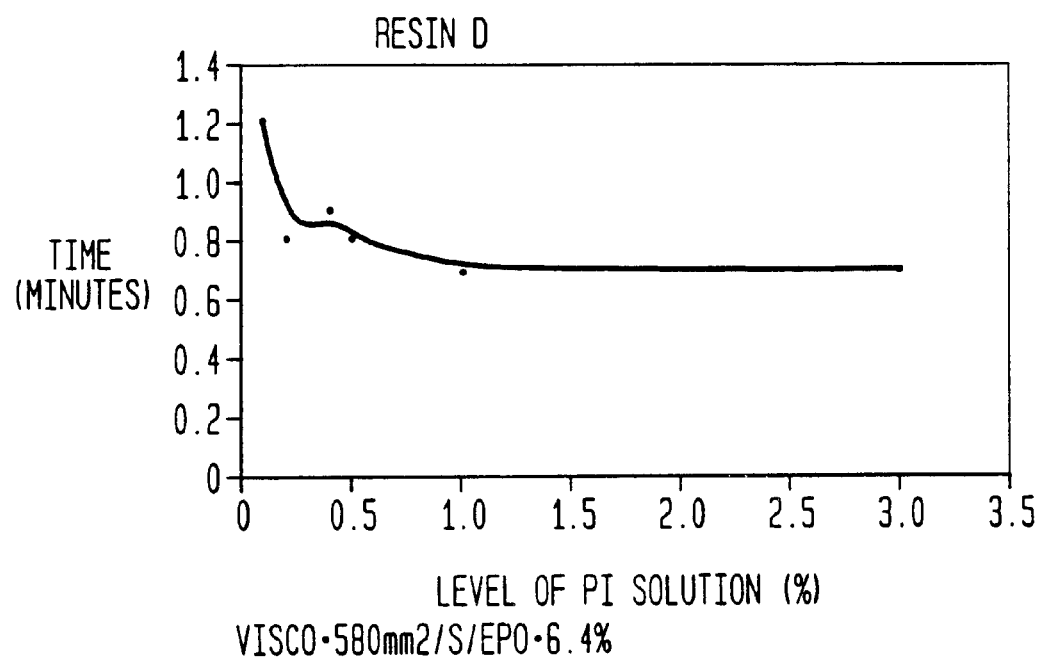

in which formulae:
the $R^1$ symbols are alike or different and represent:
  either a linear or branched $C_1$–$C_6$ alkyl radical which is optionally substituted, advantageously by one or more halogens, the preferred optionally substituted alkyl radical being: methyl, ethyl, propyl, octyl and 3,3,3-trifluoropropyl,
  or an optionally substituted $C_5$–$C_8$ cycloalkyl radical,
  or an aryl or aralkyl radical which is optionally substituted:
    in particular by halogens and/or alkoxys,
    phenyl, xylyl, tolyl and dichlorophenyl radicals being very particularly selected,
  and, more preferably still, at least 60 molar % of the $R^1$ radicals being methyls,
the Z symbols are alike or different and represent:
  either the $R^1$ radical,
  or a $G_{fp}$ group corresponding to an epoxide or vinyl ether residue connected to the silicon via a divalent radical advantageously comprising from 2 to 20 carbon atoms optionally comprising a heteroatom,
at least one of the Z symbols corresponding to a $G_{fp}$ group.
Mention may be made, as examples of $G_{fp}$ organofunctional groups of the epoxy type, of those of the following formulae:

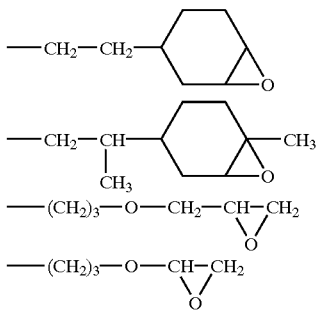

Mention may be made, as regard $G_{fp}$ organofunctional groups of the vinyl ether type, of, e.g., those present in the following formulae:

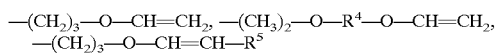

with $R^4$=
  linear or branched $C_1$–$C_{12}$ alkylene which is optionally substituted,
  or arylene, preferably phenylene, which is optionally substituted, preferably by one to three $C_1$–$C_6$ alkyl groups;
with $R^5$=linear or branched $C_1$–$C_6$ alkyl.
The POS used has a viscosity η (expressed in mPa·s at 25° C.), the value of which can vary substantially as a function of the application conditions and of the nature of the gaskets to be treated.
In the case of the treatment of a gasket which has already been coated or of the application of a thin coating, use will advantageously be made of a POS having a low viscosity of between:

200 and 3000,
preferably 300 and 2000,
and more preferably still between 400 and 900.
In the case of the treatment of an uncoated gasket or of the application of a thicker coating, use will advantageously be made of a POS having a higher viscosity of between:
  a value greater than 3000 and 10,000,
  preferably: a value greater than 3000 and 6000,
  and more preferably still: a value greater than 3000 and 5000.
These viscosity values relate both to the linear POSs and the cyclic POSs which can be employed in accordance with the use according to the invention.
The dynamic viscosity at 25° C. of all the silicone polymers considered in the present account can be measured using a Brookfield viscometer according to AFNOR Standard NFT 76 102 of February 1972.
The viscosity with which the present account is concerned is the dynamic viscosity at 25° C., known as the "Newtonian" viscosity, that is to say the dynamic viscosity which is measured, in a way known per se, at a sufficiently low shear rate gradient for the viscosity measured to be independent of the rate gradient.
In accordance with the invention, it is perfectly possible to envisage the use of a mixture of different products possessing units of formulae (V) and (VI) as defined above (linear and/or cyclic).
The preferred epoxyfunctional or vinyloxyfunctional polyorganosiloxanes are disclosed in particular in Patents DE-A-4,009,889; EP-A-0,396,130, EP-A-0,355,381; EP-A-0,105,341; FR-A-2,110,115 and FR-A-2,526,800.
The epoxyfunctional polyorganosiloxanes can be prepared by a hydrosilylation reaction between oils possessing Si—H units and epoxyfunctional compounds, such as, for example, 4-vinylcyclohexene oxide or allyl glycidyl ether.
The vinyloxyfunctional polyorganosiloxanes can be prepared by the hydrosilylation reaction between oils possessing Si—H units and vinyloxyfunctional compounds, such as, for example, allyl vinyl ether or (allyl) vinyloxyethoxybenzene.
As initiator, which is in practice a photoinitiator (PI) since the activation of the crosslinking preferably takes place under UV radiation, it is preferable to employ in accordance with the invention a PI comprising a borate anionic entity selected from the following group:

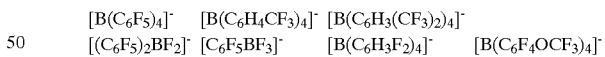

and their mixtures.
As cationic entity of the photoinitiator, the following are distinguished:
  1) onium cations of formula (I)
  2) oxoisothiochromanium cations of formula (II)
  3) mono- and/or polysulphonium cations of formula (III.1) and/or (III.2)
  4) organometallic cations of formula (IV).
The first counteranions of type 1) are disclosed in numerous documents, in particular in patents U.S. Pat. No. 4,026,705, U.S. Pat. No. 4,032,673, U.S. Pat. No. 4,069,056, U.S. Pat. No. 4,136,102 and U.S. Pat. No. 4,173,476. The following cations will very particularly be favoured among these

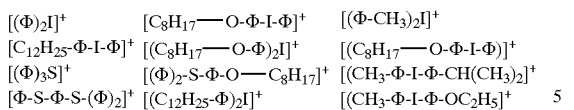

The second family of cationic entities of formula (II) of oxoisothiochromanium type, preferably comprises cations corresponding to the structure $D_1$, which is defined on page 14 of Application WO-A-90/11303 and possesses the formula (II):

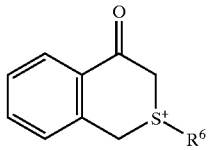

(II)

where the $R^6$ radical has the meaning given in this WO application with respect to the $R^1$ symbol; a cationic entity of this type which is more preferred is that where $R^6$ represents a linear or branched $C_1$–$C_{20}$ alkyl radical. Mention will in particular be made, as oxoisothiochromanium salts which are particularly well suited, of the sulphonium salt of 2-ethyl-4-oxoisothiochromanium or of 2-dodecyl-4-oxoisothiochromanium.

As regards the cationic entities 3), it will be specified that the polysulphonium cationic entity preferably comprises a species or a mixture of species of formula (III.1), in which formula:

the $Ar^1$ radicals, which are identical to or different from one another, each represent a phenyl radical optionally substituted by a linear or branched $C_1$–$C_4$ alkyl radical or by the group of formula:

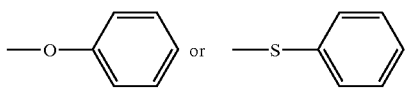

the $Ar^2$ radicals, which are identical to or different from one another and $Ar^1$, each represent a phenyl radical optionally substituted by a linear or branched $C_1$–$C_4$ alkyl radical, the $Ar^3$ radicals each represent an unsubstituted paraphenylene radical, t is equal to 0 or 1, with the additional conditions according to which:

when t=0,

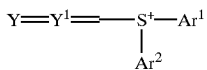

where the $Ar^1$ and $Ar^2$ radicals have the preferred meanings given immediately above in the present paragraph;

when t=1:

on the other hand, Y=$Y^2$ to $Y^4$, with:

$Y^2$=

where the $Ar^2$ radical has the preferred meaning given immediately above in the present paragraph, $Y^3$=a valency bond, $Y^4$=—O— or —S—, and on the other hand, when Y=$Y^3$ or $Y^4$ and when it is then desired to employ $Ar^1$ and $Ar^2$ (terminal) radicals connected to one another, a Y' bond is inserted consisting of a valency bond or the —O— residue.

The monosulphonium species, when some are present, which enter into the context of this preferred form are the species of formula (III.2) in which the $Ar^1$ and $Ar^2$ symbols have the preferred meanings indicated above in the preceding paragraph, including, when these radicals are directly connected to one another via a Y' residue, the insertion of a valency bond or of the —O— residue.

Mention may particularly be made, as examples of sulphonium cationic entities, of:

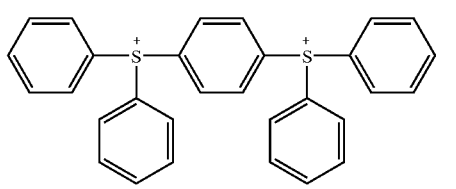

1

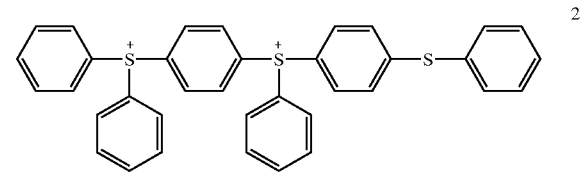

2

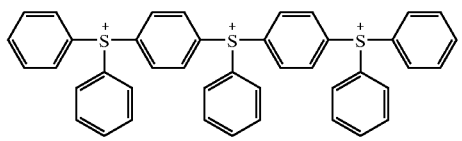

3

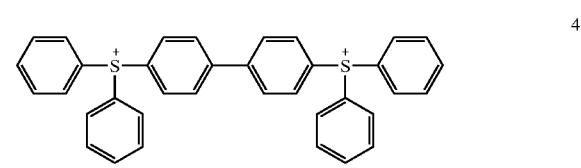

4

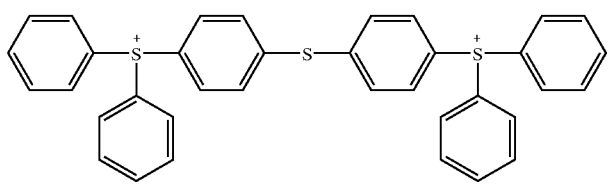

5

-continued

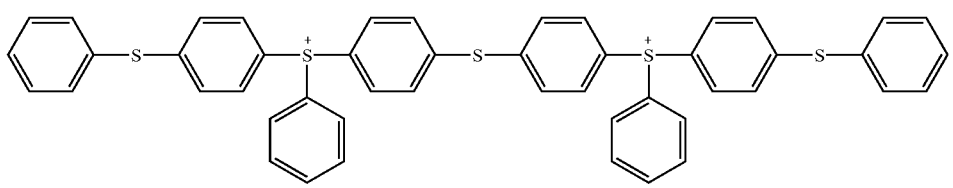

6

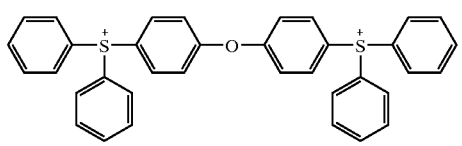

7

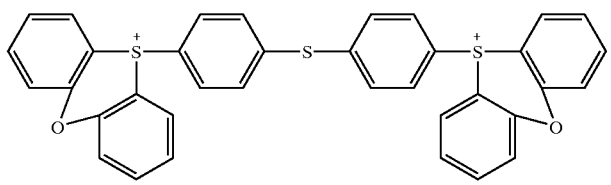

8

9

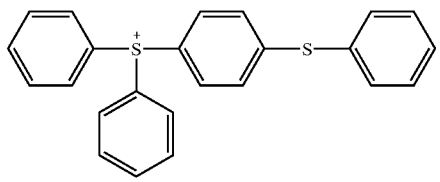

the mixtures, in variable amounts, of the species 5+ 2+optionally 3, the mixtures, in variable amounts, of the species 5 with the species 10 of formula:

10

The borate anionic entity is preferably chosen from the anions of formula $[BX_aR_b]^-$, in which:

the X symbols represent a fluorine atom, the R symbols, which are identical or different, represent a phenyl radical substituted by at least one electron-withdrawing group chosen from $OCF_3$, $CF_3$, $NO_2$ and CN and/or by at least two fluorine atoms.

The borate anionic entity of formula $[BX_aR_b]^-$ is advantageously chosen from the following anions:

$[B(C_6F_5)_4]^-$   1'

$[(C_6H_5)_2BF_2]^-$   2'

$[B(C_6H_4CF_3)_4]^-$   3'

$[B(C_6F_4OCF_3)_4]^-$   4'

$[B\{C_6H_3(CF_3)_2\}_4]^-$   5'

$[B(C_6H_3F_2)_4]^-$   6'

The novel polysulphonium borates which will very preferably be employed are the salts formed by the combination of the following cations and anions:

| Cation | Anion |
|---|---|
| 5 | 1' |
| 5 | 3' |
| 5 | 4' |
| 5 + 10 mixtures | 1' |
| 5 + 10 mixtures | 3' |
| 5 + 10 mixtures | 4' |

These polysulphonium borates can be prepared by an exchange reaction between a salt of the cationic entity (halide, such as, for example, chloride or iodide) and an alkali metal (sodium, lithium or potassium) salt of the anionic entity.

The operating conditions (respective amounts of reactants, choice of the solvents, duration, temperature and stirring) are within the scope of a person skilled in the art; these must make it possible to recover the desired polysulphonium borate in the solid form, by filtration of the precipitate formed, or in the oily form, by extraction using an appropriate solvent.

The procedures for the synthesis of the halides of the cationic entities of formula (III.1) are described in particular in: "Polymer Bulletin (Berlin)", Vol. 14, pages 279–286 (1985) and U.S. Pat. No. 4,400,541.

According to one alternative relating to the preparation of the polysulphonium borates, the latter can be prepared directly by reaction between a diaryl sulphoxide and a diaryl sulphide according to the teaching described in: "J. Org. Chem", Vol. 55, pages 4222–4225 (1990).

These novel polysulphonium borates can be employed in the state in which they are obtained on conclusion of their preparation process, for example in solid or liquid form or in solution in an appropriate solvent, in compositions comprising monomers/oligomers/polymers which are intended to be polymerized and/or crosslinked by the cationic route and under activation, for example UV activation.

The monosulphonium species (III.2) dealt with above can be in particular the coproducts which are formed during the preparation of the polysulphonium cations, the presence of which can be more or less avoided.

Up to 99%, more generally up to 90% and more generally still up to 50% by mole (of cation) of the polysulphonium species of formula (III.1) can be replaced by monosulphonium species (III.2).

As regards the fourth type of cationic entity, it is found disclosed in patents U.S. Pat. No. 4,973,722 and U.S. Pat. No. 4,992,572 and European Patent Applications EP-A-203,829, EP-A-323,584 and EP-A-354,181. The organometallic cations more readily used in practice are in particular:

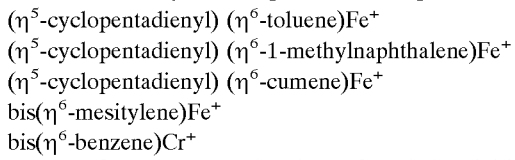

It results from the above that the preferred photoinitiators according to the invention are those corresponding to the following formulae:

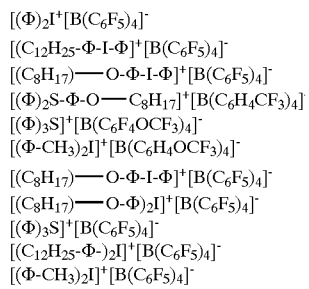

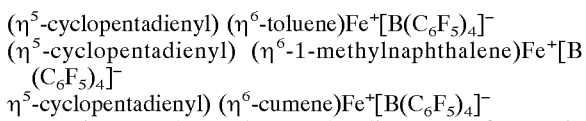

Mention may be made, as other literature reference in defining the onium borates 1) and 2) and the borates of organometallic cations 4), which are selected as photoinitiator in the context of the cylinder head gasket use according to the invention, of the entire contents of European Patent Applications No. 0,562,897 and 0,562,922. These contents are incorporated in full by reference in the present account.

The initiator salts of type 1) and 2) employed in the context of the use according to the present invention can be prepared by an exchange reaction between a salt of the cationic entity (halide, such as, for example, chloride, iodide, hexafluorophosphate, tetrafluoroborate or tosylate) and an alkali metal (sodium, lithium or potassium) salt of the anionic entity.

The operating conditions (in particular respective amounts of reactants, choice of the solvents, duration, temperature and stirring) are within the scope of a person skilled in the art; these must make it possible to recover the desired initiator salt in the solid form, by filtration of the precipitate formed, or in the oily form, by extraction using an appropriate solvent.

The alkali metal salts of the anionic entity can be prepared in a known way by an exchange reaction between a haloboron compound and an organometallic compound (for example a magnesium, lithium or tin compound) carrying the desired hydrocarbon-comprising groups, in a stoichiometric amount, optionally followed by hydrolysis using an aqueous alkali metal halide solution; this type of synthesis is, for example, disclosed in "J. of Organometallic Chemistry", Vol. 178, p. 1–4, 1979; "J.A.C.S.", 82, 1960, 5298; "Anal. Chem. Acta", 44, 1969, 175–183; patents U.S. Pat. No. 4,139,681 and DE-A-2,091,367; and "Zh. Org. Khim.", Vol. 25, No. 5, pages 1099–1102, May 1989.

The preparative method for the salts of the cationic entity 4) of formula (IV) is disclosed in particular in D. Astruc, Tetrahedron Letters, 36, p. 3437 (1973); D. Astruc, Bull. Soc. Chim. Fr., 1–2, p. 228 (1976); D. Astruc, Bull. Soc. Chim. Fr., 11–12, p. 2571 (1975); D. Astruc, CR acad. Sc. Paris, part C, 272, p. 1337 (1971); A. N. Nesmeyanov et al., Izves, Akad. Nauk SSSR, ser. Khim., 7, p. 1524 (1969); A. N. Nesmeyanov et al., Dokl. Akad. Nausk SSSR, 160 (6), p. 1327 1965); A. N. Nesmeyanov et al., Dokl. Akad. Nausk SSSR, 149 (3), p. 615 (1963).

In practice, the initiators of the use according to the invention are prepared in a very simple way by dissolution of the onium borate or organometallic complex borate, preferably onium borate, which are provided in the solid (powder) form, in a solvent.

According to an alternative relating to the onium borate, the latter can be prepared directly in the solvent from a salt (e.g., chloride) of the cation (iodonium) and from a salt (for example, potassium) of the borate anion.

Preferably, it is planned, in accordance with the use according to the invention, for the initiator (PI) to be employed in solution in an organic solvent, preferably chosen from proton-donating solvents and more preferably still from the following group: isopropyl alcohol, benzyl alcohol, diacetone alcohol, esters of hydroxylated carboxylic acid, such as, for example, butyl lactate, and their mixtures.

It should be specified that the term "effective catalytic amount of PI" is understood to mean, within the meaning of the invention, the amount sufficient to initiate the crosslinking.

As far as practicable, as indicated above, the photoinitiator is advantageously dissolved in a polar solvent, in an amount such that its content in the solution obtained is between 1 and 50% by weight, preferably between 10 and 30% by weight and more preferably still between 15 and 25% by weight.

According to an advantageous form of the use according to the invention, the incorporation of the PI in solution in the composition comprising the POS possessing a given molar content of $G_{fp}$ is carried out in a proportion of 0.1 to 10% by weight of solution with respect to the final mixture, preferably 0.5 to 5% by weight and more preferably of the order of 1% by weight.

In addition to the specific photoinitiator or photoinitiators of borate 1) to 4) type, the initiator system can comprise, according to an advantageous alternative form, at least one photosensitizer selected from (poly)aromatic products, which are optionally metallic, and heterocyclic products and preferably from the following list of products: phenothiazine, tetracene, perylene, anthracene, 9,10-diphenylanthracene, thioxanthone, benzophenone, acetophenone, xanthone, fluorenone, anthraquinone, 9,10-dimethylanthracene, 2-ethyl-9,10-dimethyloxyanthracene, 2,6-dimethylnaphthalene, 2,5-diphenyl-1,3,4-oxadiazole, xanthopinacol, 1,2-benzanthracene, 9-nitroanthracene and their mixtures.

According to one alternative form of the use in accordance with the invention, use may be made of crosslinking inhibitors, preferably chosen from alkaline products and more preferably still from alkaline products of amino type, for example of the type of those consisting of a silicone onto which is grafted at least one amine group, preferably a tertiary amine.

It is possible to resort to other additives known in this type of application of silicone compositions crosslinkable under UV radiation by the cationic route. Examples of these other additives will be given hereinbelow in a part of the present account relating to the compositions.

Systems for the preparation of antiadhesive coatings by crosslinking of a film of a silicone composition, by exposure to ultraviolet radiation and according to a crosslinking mechanism of the cationic chain reaction type, are known, as revealed in particular in the abovementioned European Patent Applications No. 0,562,897 and No. 0,562,922. However, until now, the exploitation of such systems or of such compositions for the coating (impregnation/varnishing) of sheet gaskets, in particular of cylinder head gaskets, by selecting POSs having specific levels of $G_{fp}$ crosslinking groups of epoxy or vinyl ether type, for example, had never been imagined.

The advantages of these systems are:

few or no solvents. This results in slight pollution and a low cost.

rapid crosslinking, resulting in high productivity.

weak heating, resulting in the possibility of broadening the spectrum of supports which can be envisaged.

low energy consumption, resulting in a substantial saving.

methodological simplicity and a simple device, which limit the cost of the industrial investments required.

In the case where it is employed as a varnish, the silicone composition selected in accordance with the invention is applied to a support formed by a sheet gasket, in particular a cylinder head gasket, rendered leaktight by impregnation using a silicone and/or coated with a silicone elastomer layer intended to form, for example, the gasket kerb.

Thus, in accordance with an alternative form of the invention, the support receiving the silicone coating obtained by crosslinking by the cationic route is a sheet gasket, in particular a cylinder head gasket:

which is preimpregnated with at least one material for rendering leaktight formed by at least one crosslinked polymer, preferably by at least one silicone resin, and/or which is precoated with at least one layer of at least one elastomer preferably selected from crosslinked or non-crosslinked silicone elastomers and their mixtures.

In other words, the varnishing using the selected silicone composition can be carried out either directly on the bare surface of the sheet gasket, in particular of the cylinder head gasket, whatever its nature, or on the sheet gasket, in particular the cylinder head gasket, impregnated with a crosslinked silicone resin of the condensation or polyaddition type, or on a sheet gasket, in particular a cylinder head gasket, impregnated with a crosslinked silicone resin and covered with a crosslinked or non-crosslinked silicone resin forming, for example, the gasket kerbs.

The coating according to the invention can therefore be applied to any metallic, composite (kevlar, graphite), silicone elastomer, fluorinated elastomer, of the Viton type, or NBR elastomer support.

The sheet gasket (in particular cylinder head gasket) varnish formed by the coating obtained by crosslinking by the cationic route is advantageously mono- or multilayer and exhibits a thickness of:

between 1 and 100 $\mu$m preferably between 5 and 50 $\mu$m and more preferably still between 10 and 20 $\mu$m.

According to another of these aspects, the present invention relates to a process for carrying out impregnation(s) and/or for preparing coating(s) which is (are) antiadhesive at the engine block/cylinder head interface of engines on supports composed of sheet gaskets, in particular cylinder head gaskets, characterized in that it consists essentially in employing a composition which is crosslinkable under the effect of light radiation and optionally under the effect of heat, the said composition and the support being those as defined above.

The present invention also relates to a sheet gasket, in particular a cylinder head gasket, characterized in that it is impregnated and/or coated with a matrix obtained by crosslinking by the cationic route in accordance with the use as defined above and/or with the process as described above.

Any silicone composition crosslinkable by the cationic route, characterized in that it is intended for carrying out impregnation(s) and/or for preparing coating(s) which is (are) antiadhesive on sheet gaskets, in particular cylinder head gaskets, and in that it comprises:

at least one POS possessing $G_{fp}$ groups as defined above, at least one initiator, preferably a photoinitiator (PI), of an onium borate type as defined above, at least one solvent of the PI as defined above, and at least one additive chosen from those generally employed in treatments targeted at rendering leakproof and antiadhesive the cylinder head/engine block interface and in particular sheet gaskets, such as, especially, cylinder head gaskets, also comes within the scope of the invention.

The various additives specific to the targeted final application, namely sheet gaskets and in particular cylinder head gaskets, are, e.g., one or more crosslinking inhibitors preferably chosen from alkaline products and more preferably still from alkaline products of amino type, for example of the type of those consisting of a silicone onto which is grafted at least one amine group, preferably a tertiary group, or alternatively of the type of those comprising a piperidinyl residue which is optionally alkyl-substituted.

The compositions according to the invention can also comprise:

adhesion modifiers (linear silicone resins or polymers carrying, for example, vinyl, epoxy, vinyl ether or alcohol functional groups), such as, for example, those disclosed in European Patent Application No. 0,738,769;

one or more photosensitizers of the type of those mentioned above, one or more fillers, such as, for example: inorganic fillers, such as in particular milled natural or synthetic (polymer) fibres, calcium carbonate, talc, clay, titanium dioxide, or precipitation or combustion silica;

one or more polymerization and/or crosslinking accelerators preferably chosen from hydroxylated carboxylic acid esters which are liquid at ambient temperature (23° C.);

one or more thixotroping agents;

and their mixtures.

Likewise, soluble dyes, oxidation inhibitors and/or any other material which does not interfere with the catalytic activity of the photoinitiator and which does not absorb in the wavelength range chosen for the photoactivation can also be added to the composition or employed in the context of the process according to the invention.

These compositions in accordance with the invention are prepared, without distinction, before (indeed even long before) or else immediately before use.

It should be noted that these compositions are particularly stable on storage and that they offer, in accordance with the process of the invention, rapid crosslinking kinetics. In addition, their non-crosslinked state, before exposure to the activating light radiation, makes them very easy to handle, to apply or to position on sheet gaskets, such as, in particular, cylinder head gaskets.

The process according to the invention which makes it possible to render sheet gaskets, in particular cylinder head gaskets, non-adhesive consists in applying an amount of composition of the invention, generally of between 2.5 and 250 g per $m^2$ of surface to be coated, and in crosslinking the composition by supplying energy, at least a portion of which, preferably all of which, is provided by UV radiation.

The UV radiation used exhibits a wavelength of between 200 and 400 nanometers, preferably of between 254 and 360 nanometers.

The duration of irradiation can be short and it is generally less than 1 second and is of the order of a few hundredths of a second for very thin coatings. The crosslinking achieved is excellent, even in the absence of any heating. Of course, the coupling of the photoactivation to a thermal activation, e.g. by heating between 25 and 100° C., is not excluded from the invention.

Of course, the curing time can be adjusted, in particular by the number of UV lamps used, by the duration of exposure to the UV radiation and by the distance between the composition and the UV lamp.

The amounts of compositions deposited on the supports are variable and generally range between 2.5 and 250 g/$m^2$ of surface treated. These amounts depend on the nature of the supports and on the desired antiadhesive properties. They are generally between 10 and 50 g/$m^2$ for non-porous supports.

The following examples are given by way of illustration and cannot be regarded as a limit on the field and spirit of the invention.

EXAMPLES

I—Starting Materials

I.1. The functionalized polyorganosiloxanes (UV RESIN) employed are (1,2-epoxycyclohex-4-ylethyl)-polydimethylsiloxanes of formula:

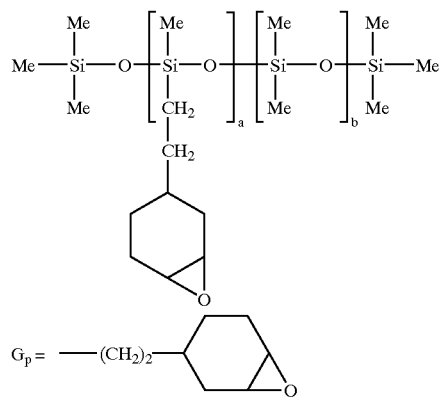

Several POSs having different epoxy levels are prepared.

This synthesis is carried out in the following way:

The silicone oil employed is a polydimethylhydrosiloxane (PDMS) of following simplified formula: $M_2D'_aD_b$

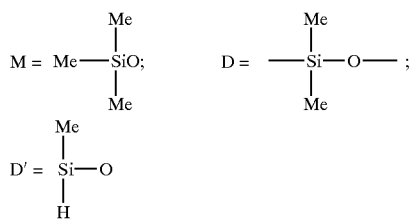

The catalyst=Karstedt Pt comprising 10% of Pt in divinyltetramethyldisiloxane; this catalyst can be used as required as a mixture with a Pt-inhibiting agent consisting of thiodiethanol.

The A21 resin is an Amberlite exchange resin.

Methodology

Phase I: Hydrosilylation Phase

⅓ of the SiH silicone oil is charged under $N_2$ (1st part)

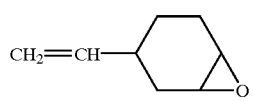

is charged with stirring the catalyst: 10% Karstedt Pt, is charged the mixture is slowly heated to 60° C. under $N_2$ the 2nd part of the silicone oil is charged while maintaining θ=60–80° C. (duration of introduction: 0.5 to 1 h)

the reaction mixture is maintained until a maximum $DC_{SiH}$ % is achieved (residual SiH<300 ppm)

Phase II: Removal of the Pt the A21 resin (milled, dried) is charged the mixture is maintained at 60°–80° C. until maximum decoloration of the medium is obtained (duration≧10 hours in order to obtain<100 hazen units)

the mixture is filtered in order to remove the ion exchange resin

Phase III: Removal of the Light Products the mixture is devolatilized under vacuum: 120/125° C., 5 mm Hg, under $N_2$ stripping, in order to remove the silicone oligomers and the excess VCMX.

a final clarification is carried out in order to remove possible microgels formed during the preceding stage. Yield of final polymer recovered≈90%.

Data by weight

| Products charged | Units by weight | | | | |
|---|---|---|---|---|---|
| | A | B | C | D | E |
| Total silicone oil | 93.6 | 105.9 | 99.37 | 86.64 | 95.25 |
| VCMX | 14.7 | 2.38 | 8.93 | 21.66 | 13.05 |
| Catalyst | 8.4 × $10^{-3}$ | 8.4 × $10^{-3}$ | 8.4 × $10^{-3}$ | 8.4 × $10^{-3}$ | 8.4 × $10^{-3}$ |
| A21 Resin | 0.64 | 0.64 | 0.64 | 0.64 | — |
| Thiodiethanol | — | — | — | — | 10.8 |
| Products extracted | Units by weight | | | | |

-continued

| Products charged | Units by weight | | | | |
|---|---|---|---|---|---|
| | A | B | C | D | E |
| Volatiles | 8.1 | 7.8 | 8.3 | 8.2 | 7.9 |
| Final polymer | 100 | 100 | 100 | 100 | 100 |

The POSs A, B, C, D and E thus obtained are defined in the table below:

| POS | a | b | Level of $G_{fp}$ epoxide/POS (in equivalent per kg) | η at 25° C. (in mPa.s) |
|---|---|---|---|---|
| A | 7 | 85 | 0.90 | 350 |
| B | 3 | 240 | 0.16 | 780 |
| C | 6 | 123 | 0.58 | 580 |
| D | 11 | 63 | 1.60 | 580 |
| E | 27 | 343 | 0.88 | 4600 |

I.2. The initiator (hereinafter known as photoinitiator PI) is an onium borate: ditolyliodonium tetrakis(pentafluorophenyl)borate of formula:

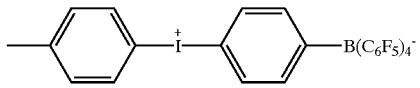

The cation of this onium borate is prepared according to the general methodology disclosed in European Patent Applications Nos. 0,562,922 and 0,562,897. The procedure as regards the borate anionic entity is as follows:

Bromopentafluorobenzene (21.3 g, 0.086 mol) and isopropyl ether are charged, under an inert atmosphere, to a 500 ml round-bottomed flask equipped with mechanical stirring, a reflux condenser and a dropping funnel. The mixture is stirred and is cooled to a temperature of −78° C. using an acetone+dry ice bath.

n-Butyllithium, in solution in hexane (1.6M, 52.3 ml, 0.97 eq), is charged to the dropping funnel and is then added over approximately 10 minutes. The mixture is subsequently left stirring at a temperature of −78° C. for 30 min. The dropping funnel is replaced by a dropping funnel comprising boron trichloride in solution in hexane (1.0M, 19 ml). The boron trichloride is added over 15 min and then the reaction mixture is left stirring at a temperature of −78° C. for 30 min. The mixture is subsequently allowed to return to room temperature over approximately 1 h. A saturated aqueous KCl solution (100 ml) is then added. The mixture then has two phases and is homogeneous. The isopropyl ether is distilled off. The $KB(C_6F_5)_4$ precipitates at the end of distillation. It is recovered by filtration and is then washed with a saturated KCl solution (100 ml) before being dried under vacuum at a temperature of 35° C.

A product assaying 97% of expected product is thus obtained, with a yield of 99%.

The solvents used are isopropyl alcohol, butyl lactate, esters of diacetone alcohol or their mixtures.

The photoinitiator system is prepared by dissolving the onium borate (optionally complemented with a portion of the epoxidized PDMS to be employed) in the solvent.

II. The general procedure followed is as follows:
x part by weight of a solution of onium borate in a solvent (assay 18% by weight) is added
to 100 parts by weight of epoxidized PDMS,
and mixing is carried out by manual stirring for 30 minutes.

III—Equipment

III.1 Type of UV lamp: FUSION SYSTEM® F450 technology (Company Fusion)
Total power of the lamp: 120 watts
The emitter of the UV lamp is composed of a transparent quartz tube filled with mercury. The UV radiation is produced by excitation of the emitter with microwaves and magnetons, thus causing the evaporation of the mercury and the emission of UV radiation: UV Fusion system.

III.2 Characteristics of the UV bench:
The UV bench belt can reach a maximum speed of forward-progression of the order of 52 m/min. The speed of this bench can be adjusted according to the requirements of the user or of the nature of the product to be crosslinked.

III.3 Meyer bar:
A Meyer bar is used to deposit a thin film on the gaskets. This bar contains grooves along its shaft which make it possible, after application of the resin, to obtain the desired thickness. Deposition is carried out automatically using an electric motor, with which it is possible to vary the rate of passage of the bar over the gasket.

III.4 Cylinder head gaskets:
The tests were carried out on conventional "soft" gaskets (board gaskets) originating from the "Payen" group or from "Meillor gasket".
These board gaskets are composed of a block of composite fibers (generally based on Kevlar) which is sandwiched and fastened to a wire mesh.

Example 1

Influence of the content of photoinitiator on the Shore A hardness of the resin obtained by crosslinking under UV radiation of an epoxyfunctionalized POS A The POS employed is POS A.

The PI is dissolved in a proportion of 18% by weight in butyl lactate.

The POS comprises an inhibitor with the function of increasing the pot life of the resin. It is present at a level of 50 ppm in the POS. In all the examples, this inhibitor is composed of a tertiary amine sold under the trade name Tinuvin 765 by the company Ciba-Geigy (1,2,2,6,6-pentamethyl-4-piperidyl derivative).

The methodology used is that described in the preamble of the examples.

The Shore A hardness measurements were carried out at different levels of photoinitiator solution, 1%, 1.5%, 2%, 2.5% and 3% (resin with inhibitor and photoinitiator in butyl lactate). Two repeatability tests were carried out (Tests 1 and 2).

The reference is formed by a two-component polyaddition resin (part A and part B mixed at 50/50 by weight).

The part A is composed of a vinylated silicone oil and of a platinum catalyst (2.5% of vinyl groups and 45 parts per million of platinum).

The part B is composed of a mixture of different vinylated or hydrogenated silicone oils and of a polymerization retarder "composed of ethynylcyclohexanol" (1.5% of vinyl groups and 20% of polymethylhydrosiloxane groups).

Results:

TABLE 1

| Weight % PI solution with respect to the POS | 1% | 1.5% | 2% | 2.5% | 3% | Reference |
|---|---|---|---|---|---|---|
| Shore A hardness Test 1 | 78.4 | 74.7 | 76.4 | 76.3 | 74.5 | 74.2 |
| Shore A hardness Test 2 | 79.3 | 79.7 | 76.7 | 73.9 | 73.7 | 73.2 |

Analysis:

The Shore A hardness is virtually identical, whatever the composition of the UV resin +% of photoinitiator mixture. It is spread over a hardness range of between 74 and 80. It is slightly greater than the hardness of the reference resin. These results thus obtained prove that the resin has the same level of crosslinking, whatever the concentration of PI.

Example 2

Determination of the König hardness 2.1. INFLUENCE OF THE SPEED OF FORWARD PROGRESSION OF THE UV BENCH ON THE KÖNIG HARDINESS OF THE RESIN WITH INHIBITION COMPRISING DIFFERENT % OF PHOTOINITIATOR (BUTYL LACTATE)

The object of this study consists in monitoring, by virtue of the König hardness, the change in the crosslinking of the UV resin of type A as a function of the duration of exposure to UV radiation and the proportion of photoinitiator added. Coating was carried out with a Meyer bar No. 3 (thickness deposited approximately 20 μm) on paper. The resin, once crosslinked at different speeds of forward progression, is subsequently subjected to the König pendulum.
Results:

TABLE 2

| % PI in solution with respect to the POS + PI mixture Speed | 1% König hardness | 1.5% König hardness | 2% König hardness | 2.5% König hardness | 3% König hardness |
|---|---|---|---|---|---|
| 12.5% maxi speed 4 m/minute | 26.6 | 22.6 | 21.9 | 28.4 | 23.5 |
| 25% maxi speed 11.5 m/minute | 29.4 | 25.2 | 24.9 | 24.1 | 19.6 |
| 50% maxi speed 28.1 m/minute | 23.4 | 22.4 | 23.1 | 21 | 24.1 |
| 75% maxi speed 39.2 m/minute | 25.6 | 21 | 22.9 | 23.8 | 21 |
| 100% maxi speed 52.1 m/minute | 28.7 | 22.4 | 24.7 | 23.3 | 24.1 |

POS resin with 50 ppm of inhibitor composed of Tinuvin.
Analysis:

From the analysis of the table relating to the König hardness of the UV resin (with inhibitor) with different levels of photoinitiator (butyl lactate) as a function of the speed of the UV bench, it is found that the crosslinking takes place in all cases, whatever the percentage of photoinitiator and the speed, even for a low content of photoinitiator and a maximum speed on the UV bench. The König hardness values, independently of the % of photoinitiator and of the speed of the UV bench, lie between 19.6 and 29.4. However, it would seem that the 1% mixture has a better degree of crosslinking higher than the other mixtures, despite the variation in the speed of forward progression of the bench.

2.2. CHANGE OVER TIME OF THE KÖNIG HARDNESS OF THE RESIN A (WITH INHIBITOR) AND OF THE REFERENCE RESIN ON A METAL (STEEL) PLATE COATED ON ONE SIDE WITH AN ADHESION PROMOTER

A metal plate, degreased beforehand, is coated on one side with an adhesion promoter or primer (4% isopropyl titanate in isopropyl alcohol). The resin (resin A and reference resin) is subsequently deposited on each face and the change in the König hardness is subsequently monitored five days after application.
Results:

TABLE 3

| % by weight PI in solution with respect to the POS + PI mixture | 1st day without primer König hardness | 2nd day with primer König hardness | 5th day without primer König hardness | 5th day with primer König hardness |
|---|---|---|---|---|
| 2% | 35.0 | 25.2 | 37.0 | 33.6 |
| 3% | 39.2 | 31.4 | 45.6 | 33.9 |
| Reference | 48.2 | 58.5 | 48.5 | 59.4 |

Analysis:

The König hardness of the reference resin is greater than that of the resin A. However, its value remains unchanged over time, after five days at ambient temperature. The adhesion promoter improves the hardness in the case of the reference resin. As regards the resin A, the adhesion promoter decreases the König hardness. The hardness of the resin A increases after five days at ambient temperature.

Example 3

Monitoring of the antiadhesiveness of the UV resin
Principle: ASTM F 607-84 standard test The antiadhesiveness test is carried out by using an extensometer. A thin film of POS A resin is applied, by coating by virtue of a Meyer bar, to each face of a preimpregnated soft (or board) gasket. This resinous film, with an oily appearance, is subsequently crosslinked by passing under a UV bench, the speed of forward progression of the belt of which is 2.8 m/min, in order to ensure that the crosslinking is complete. In the case of the reference resin, the gasket, after coating with the Meyer bar, is, for its part, placed inside an oven calibrated at a temperature of 150° C. for approximately 5 to 10 minutes.

After varnishing the gasket, the gasket is cut with a hollow punch is order to form two circular disc-shaped test specimens (ϕ 50 mm) comprising, on each of these faces, the antiadhesive varnish. Each disc is placed between two supports made of G5 cast iron. A pressure of 10 MPa is exerted, using a press, on the supports containing the circular gasket in order for the conditions to be those of the tightening of the cylinder head gaskets during the assembly of the engine. The pressure of 10 MPa is achieved by tightening the screw bolts situated at the ends of the press using a spanner with a dynamometer attached.

All the presses comprising the varnished disc samples are subsequently subjected to a temperature of 130° C. for 72 hours.

After a period of 72 hours in the oven at 130° C., the presses are removed from the oven and left at ambient temperature for one day in order to cool. They are subsequently dismantled in order to recover the supports comprising the circular gaskets. These supports are inserted into appropriate jaws of the extensometer, the role of which will be to measure the breaking force (in Newtons) which has to be exerted in order to separate the two supports in which the gasket is imprisoned. This is because the varnishing resin deposited on the gasket can, as a result of having been subjected to a temperature of 130° C. and a pressure of 10 MPa for 72 hours, interact with the material of the supports, that is to say adhere to the supports.

If the extensometer indicates a high breaking force, this means that the varnish adheres to the support and that the antiadhesiveness of the resin is low.

It sometimes happens that the supports automatically become detached during the dismantling of the press after the obligatory spell in the oven at 130° C. for 72 hours. This spontaneous detachment of the prevarnished gasket arises from the excellent antiadhesive property of the silicone resin which has been used for the coating. The adhesion of the gasket is completely insignificant. It will therefore be accepted that the breaking force, resulting from the separating of two supports comprising the gasket, is zero and that the antiadhesiveness capacity of the resin is considerable.

After the sample has failed on the extensometer, each support which has been used for griping the gasket is analysed by the operator in order to estimate the percentage of resin remaining attached. This percentage can be expressed as % of cohesive or adhesive failure, 100% of cohesive failure means that the gasket has adhered to the support such that it has torn, dividing into two parts which remain bonded to their initial contact support. 0% of cohesive failure corresponds to perfect antiadhesiveness of the resin on the supports; no trace of resin remains on the support after the sample has failed on the extensometer.

Results:

Resin tested=UV resin of type A with Tinuvin inhibitor (50 ppm) and reference resin Coating: Meyer bar No. 3, thickness of approximately 15–20 μm UV crosslinking: 1 passage under a UV bench, speed= 10% (2.8 m/mn)

Crosslinking: Reference resin: 10–15 minutes at 150° C. with a constant temperature rise from 70° C. to 150° C.

TABLE 4

| % PI in solution with respect to the POS + PI mixture | Breaking force in N | Breaking stress in MPa | Type of failure |
| --- | --- | --- | --- |
| 1% No. 1 | 274.1 | 0.140 | 90% adhesive |
| 1% No. 2 | 562.2 | 0.287 | 85% adhesive |
| Mean 1% | 418.2 | 0.213 | 85%–90% adhesive |
| 2% No. 1 | 493.1 | 0.251 | 80% adhesive |
| 2% No. 2 | 503.4 | 0.257 | 70% adhesive |
| Mean 2% | 498.2 | 0.254 | 75% adhesive |
| 3% No. 1 | 563.5 | 0.287 | 75% adhesive |
| 3% No. 2 | 156.9 | 0.080 | 65% adhesive |
| Mean 3% | 360.2 | 0.184 | 70% adhesive |
| Reference No. 1 | 439.4 | 0.224 | 95% adhesive |
| Reference No. 2 | 346.6 | 0.177 | 98% adhesive |
| Mean reference | 393.0 | 0.200 | 97% adhesive |

Analysis:

If reference is made to Table 4, in which the antiadhesiveness test values of the UV resin of type A and of the reference resin are combined, the result is that the UV resin has approximately the same antiadhesive capacity independently of the content of photoinitiator (mean value of the breaking force of between 498 and 360 N). This antiadhesiveness is comparable with that of the reference resin (mean value of the breaking force of 393 N). The antiadhesiveness of the reference resin is of the same order of magnitude as that of the UV resin.

CONCLUSION

The UV resin of type A (resin with Tinuvin inhibitor, photoinitiator diluted in butyl lactate) has the same mechanical properties as the reference resin. The antiadhesiveness test has shown that the % adhesive failure was close to 100% for the reference resin and that it is between 70% and 90%, as regards the UV resin, despite an equivalent breaking force.

Example 4

Influence of the presence of inhibitor and of the chemical nature of the diluent used for the photoinitiator on the antiadhesiveness 4.1 UV resin of type A;

Principle

In order to find out what were the influences of the inhibitor and of the diluent on the antiadhesiveness, a series of four mixtures (NRNC, NRAC, ARNC and ARAC) with a content of photoinitiator solution of 2% was subjected to the antiadhesiveness test.

Results: cf. Table 5

Resins:

Resin tested: Resin A (idem Examples 1 to 3) described in I.1.

Reference resin (idem examples 1 to 3) described in Example 1.

inhibitor: Tinuvin (idem Examples 1 to 3).

Coating: Meyer bar No. 3, thickness of approximately 15–20 μm

UV crosslinking: 1 passage under a UV bench, speed= 10% (2.8 m/min)

Crosslinking: Reference resin: 10–15 minutes at 150° C. with a constant temperature rise from 70° C. to 150° C.

TABLE 5

| Resins | Breaking force in N | Breaking stress in MPa | Type of failure |
| --- | --- | --- | --- |
| NRNC 2% No. 1 | 493.1 | 0.251 | 80% adhesive |
| NRNC 2% No. 2 | 503.4 | 0.257 | 70% adhesive |
| Mean NRNC 2% | 498.2 | 0.254 | 75% adhesive |
| NRAC 2% No. 1 | 89.0 | 0.045 | 95% adhesive |
| NRAC 2% No. 2 | 39.1 | 0.020 | 95% adhesive |
| Mean NRAC 2% | 64.0 | 0.033 | 95% adhesive |
| ARNC 2% No. 1 | 0 | close to 0 | 100% adhesive |
| ARNC 2% No. 2 | 0 | close to 0 | 100% adhesive |
| Mean ARNC 2% | 0 | close to 0 | 100% adhesive |
| ARAC 2% No. 1 | 0 | close to 0 | 100% adhesive |
| ARAC 2% No. 2 | 28.6 | 0.015 | 100% adhesive |
| Mean ARAC 1% | 14.3 | 0.007 | 100% adhesive |
| Reference No. 1 | 372.8 | 0.190 | 90% adhesive |
| Reference No. 2 | 402.2 | 0.205 | 90% adhesive |
| Mean Reference | 387.5 | 0.198 | 90% adhesive |

NRNC = UV resin with 50 ppm inhibitor and photoinitiator diluted in butyl lactate
NRNC = UV resin with 50 ppm inhibitor and photoinitiator diluted in IPA = isopropyl alcohol
ARNC = UV resin without inhibitor and photoinitiator diluted in butyl lactate
ARAC = UV resin without inhibitor and photoinitiator diluted in IPA Comment:

For the two tests on the ARNC resin and the second test on the NRAC resin, the supports made of $G_5$ cast iron comprising the gasket separate straightforwardly during the dismantling of the press, after having been placed in an oven at a temperature of 130° C. It is considered that the breaking force is zero and that the breaking stress is approximately equal to 0.

Analysis

The influence of the inhibitor on the antiadhesiveness of the varnish is significant. The UV resins which do not comprise inhibitor (ARNC and ARAC) have a virtually zero breaking force and it is sometimes unnecessary to carry out the antiadhesiveness test on the supports comprising the varnished gasket because, during the dismantling of the press, the gasket does not have any adhesion to the supports. The ARNC and ARAC UV resins, in comparison with the reference resin (breaking force equivalent to 387.5N), have a greater antiadhesive property.

The inhibitor-free UV resins (ARNC and ARAC) have an adhesive failure of 100% (90% of adhesive failure for the reference resin). These adhesive failures of 100% of the ARNC and ARAC UV resins prove that the latter do not adhere to the supports made of G5 cast iron and behave excellently when faced with the stress exerted by the antiadhesiveness test.

4.2—UV resin of type E:

Example 4.1 is repeated, starting with the resin E described in I.1. A mixture of ARAC type having a content of photoinitiator solution of 1% was subjected to the antiadhesiveness test.

Results:
breaking force in N: 0,
breaking stress in MPa: close to 0,
type of failure: 100% adhesive.

Example 5

Monitoring of the dynamic viscosity of the UV resins (NRNC, NRAC, ARNC and ARAC) with a 2% content of photoinitiator solution The object of this experiment is to evaluate the dynamic viscosities of each UV resin over a period of three days and to follow its change, in order to assess the pot life of each resin studied.
→Results:

TABLE 6

| Resins | NRNC 2% | NRAC 2% | ARNC 2% | ARAC 2% |
|---|---|---|---|---|
| Dynamic viscosity 1st day (centipoise) | 340 | 290 | 305 | 310 |
| Dynamic viscosity 3rd day (centipoise) | 360 | 325 | 330 | solid crosslinked resin |

NRNC = UV resin of type A with 50 ppm inhibitor and photoinitiator diluted in butyl lactate
NRAC = UV resin of type A with 50 ppm inhibitor and photoinitiator diluted in IPA
ARNC = UV resin of type A without inhibitor and photoinitiator diluted in butyl lactate
ARAC = UV resin of type A without inhibitor and photoinitiator diluted in IPA (Tinuvin).

Example 6

Determination of the rate of polymerization of the UV resins

The object of this example is to evaluate the rate of polymerization of each type of UV resin and to find out at what content of photoinitiator it is fastest, in order to confirm the results obtained above and to estimate the highest degree of crosslinking. The rate of polymerization is determined using a VNC RAPRA UV device (Company Rapra Ltd).

The time at which 95% (TBS) of the resin has crosslinked is measured. This time will subsequently be plotted on graphs.

6.1 UV resin of type A:

The appended FIG. 1 represents the T95=f(content of 18% photoinitiator solution) curves for the resin A, the composition being varied as indicated below:

Nrnc=UV resin of type A with 50 ppm inhibitor and photoinitiator diluted in butyl lactate NRAC=UV resin of type A with 50 ppm inhibitor and photoinitator diluted in IPA ARNC=UV resin of type A without inhibitor and photoinitiator diluted in butyl lactate ARAC=UV resin of type A without inhibitor and photoinitiator diluted in IPA 6.2. UV resin of A, B, C, D and E type (cf. I.1)

The appended FIGS. 2 to 5 represent the T95=f(content of 18% photoinitiator solution) Rapra curves for the resins A to D according to I.1 above. The solvent is IPA. No inhibitor is provided. For the resin of type E, the T95 Rapra value is 08 minutes with a content of photoinitiator solution of 1%.

Example 7

Behaviour towards oils of the UV resins 7.1 UV resin of type A:

Principle:

The behaviour towards oils makes it possible to confirm the harmlessness and the stability of the resin with regard to oils appointed for the lubrication of the engine under the physical conditions (temperatures) and mechanical conditions laid down by the speed of the engine. This test is essential insofar as it makes it possible to decide whether an antiadhesive silicone resin does not decompose and whether it fully retains its initial properties. The aim of this test is to confirm that the resin has the appropriate qualities in order to be subjected as little as possible to the chemical attacks with which it is confronted and to which it is exposed during the operation of an engine.

In order to assess the behaviour towards oils, a sample of resin of predetermined mass is placed in the engine oil and is subjected to a temperature of 150° C. for 72 hours. The following parameters are subsequently examined.

the change in mass the variation in Shore A hardness the difference in thickness.

When all the experimental data have been collected, the loss or the increase in mass, in thickness and in hardness are determined as a percentage (%).

A percentage close to 0%, whatever the parameter studied (mass, hardness or thickness), confirms excellent behaviour towards oils under the conditions of simulation of an engine operating at a steady speed (150° C.).

Results:

The behaviour towards oils was carried out for UV resins of type A (cf. I.1) without inhibitor=AR (0.5%; 1% of photoinitiator AC or NC) and with inhibitor NR (1%; 3% of photoinitiator).

NR: UV resin with 50 ppm inhibitor

AR: UV resin without inhibitor

NC: photoinitiator diluted to butyl lactate

AC: photoinitiator diluted in IPA

The photoinitiator, the inhibitor, the resin A and the reference resin are the same as in Examples 1 to 6.
Variation in percentage of the mass of the NR and AR UV resins before and after behaviour towards oils at 150° C.

TABLE 7

| Percentages | % M mass (g) | % Shore A hardness | % T thickness (mm) |
|---|---|---|---|
| NRNC 1% | +6.39 | breakable | +2.73 |
| NRNC 3% | +6.55 | breakable | +4.74 |
| NRAC 1% | +7.7 | breakable | +2.42 |
| NRAC 3% | +8.65 | breakable | +3.11 |
| ARNC 0.5% | +4.87 | −4.95 | +3.59 |
| ARNC 1% | +5.20 | −2.27 | +2.28 |
| ARAC 0.5% | +5.75 | −2.12 | +1.48 |
| ARAC 1% | +6.63 | −2.13 | +2.78 |
| Reference | +4.90 | −4.77 | +1.63 |

Analysis:

According to the values of masses collected, the reference resin and the resin of type A-ARNC 0.5% share the heat behaviour towards oils. The A-NR resins have a poorer behaviour towards oils, whereas the A-AR resins have a superior behaviour towards oils. The A-NR resins have a tendency to be breakable. The Shore A hardness and the thickness of the resin A and of the reference resin are not affected by the behaviour towards oils.

7.2. UV resin of type E:

Example 7.1 is repeated, starting with the resin E described in I.1. A mixture of type ARAC having a content of photoinitiator solution of 1% was subjected to the test of behaviour towards oils.
Results:

% M mass (g): +6.4,
% Shore A hardness: −2.5,

Example 8

Behaviour towards the cooling liquid
8.1. UV resin of type A:
Principle:

The test of behaviour towards the cooling liquid is comparable with the test of behaviour towards oils. The object of this study is to confirm the harmlessness of the UV resin on contact with the glycol or cooling liquid. The analysis and the experimental procedure of the behaviour towards the cooling liquid are virtually analogous to those of the behaviour towards oils, except that the resinous and crosslinked samples are placed inside an oven of 100° C. for 72 hours in 100 ml of cooling liquid. This test makes it possible to imitate the normal conditions of operation of an engine and to observe whether there is not decomposition of the resin by the glycol.
Results:

The behaviour towards the cooling liquid was carried out for resins of type A (Cf.I.1) without inhibitor=AR (0.5%; 1% of photoinitiator AC or NC) and of type A with inhibitor NR (1%; 3% of photoinitiator).

NR: UV resin with 50 ppm inhibitor
AR: UV resin without inhibitor
NC: photoinitiator diluted in butyl lactate
AC: photoinitiator diluted in IPA The photoinitiator, the inhibitor, the resin A and the reference resin are the same as in Examples 1 to 7.

TABLE 8

| Percentages | % M mass (g) | % Shore A hardness | % T thickness (mm) |
|---|---|---|---|
| NRNC 1% | −8.64 | breakable | −6.81 |
| NRNC 3% | −3.42 | breakable | −4.78 |
| NRAC 1% | −5.40 | breakable | −2.39 |
| NRAC 3% | −3.36 | breakable | −3.36 |
| ARNC 0.5% | −1.83 | −3.30 | −1.52 |
| ARNC 1% | −2.38 | −2.51 | −3.61 |
| ARAC 0.5% | −1.80 | −2.85 | −2.41 |
| ARAC 1% | −4.74 | −6.56 | −5.34 |
| Reference | −1.30 | −1.15 | −0.85 |

Analysis:

The loss in mass caused by a behaviour towards the cooling liquid is greater for the A-NR than AR resins. However, it is the reference resin which has the best behaviour towards the cooling liquid (% M=−1.30). The A-NR resins with 0.5% of photoinitiator have an excellent behaviour towards the cooling liquid comparable with that of the reference resin. After behaviour towards the cooling liquid, the A-NR resins are crumbly and breakable. The thickness and the Shore A hardness show little variation.

8.2. UV resin of type E:

Example 8.1 was repeated, starting from the resin E described in I.1. A mixture of type ARAC having a content of photoinitiator solution of 1% was subjected to the test of behaviour towards the cooling liquid.
Results:

% M mass (g): −5,
% Shore A hardness: +8.

Example 9

Determination of the level of crosslinking by the level of extractables (Ext)

Principle:

Evaluation of the influence of a solvent on the chemical structure of the crosslinked silicone resin. A cylindrical resin test specimen is placed for 72 h in the solvent, care being taken to weigh it beforehand.

The level of extractables corresponds to the percentage of mass of resin extracted by the solvent (methylcyclohexane). If this level is high, the mass recovered by the solvent is therefore high. This mass is directly related to the degree of crosslinking because the greater the level of extractables, the poorer the crosslinking of the resin analysed. This is because a high level of extractables means that the solvent more readily attacks or decomposes the resin. Conversely, a low level of extractables corresponds to a consequent level of crosslinking.

initial M: mass of the resin after crosslinking
swollen M: mass of the resin having absorbed solvent (72 hours in methylcyclohexane)
ext M: mass of resin recovered by the solvent (initial M—final M)
final M: initial mass minus the mass extended by the solvent (spell in an oven of the swollen mass at 70° C. for 24 hours)

Level of extractables:
Ext %=(initial M—final M) 100/initial M

The resin A (cf. I.1), the reference resin, the inhibitor (with NR −50 ppm, without AC) and the photoinitiator are the same as in Examples 1 to 8.
Results:

The experimental conditions are the same as in Example 8.

TABLE 9

|  | Initial M | Swollen M | Ext M | Final M | % S | % Ext | Mc |
|---|---|---|---|---|---|---|---|
| NRNC 1% | 2.9110 | 4.4320 | 0.1460 | 2.7650 | 52.25 | 5.02 | 495.29 |
| NRNC 3% | 2.8125 | 4.4735 | 0.1005 | 2.7120 | 59.06 | 3.57 | 728.13 |
| NRAC 1% | 2.5855 | 3.9345 | 0.0995 | 2.4860 | 52.17 | 3.85 | 454.87 |
| NRAC 3% | 2.8650 | 4.9560 | 0.2375 | 2.6275 | 72.98 | 8.29 | 788.58 |
| ARNC 0.5% | 3.0115 | 4.1060 | 0.0955 | 2.9160 | 36.34 | 3.17 | 263.83 |
| ARNC 1% | 2.6150 | 3.6925 | 0.1100 | 2.5055 | 41.20 | 4.19 | 316.62 |
| ARAC 0.5% | 2.8315 | 3.9870 | 0.1580 | 2.6735 | 40.81 | 5.58 | 312.08 |
| ARAC 1% | 2.6935 | 4.1585 | 0.1190 | 2.5745 | 54.39 | 4.42 | 485.89 |
| Reference | 2.7440 | 3.9080 | 0.1160 | 2.6280 | 42.42 | 4.23 | 330.66 |

Mc: Number-average mass of the interchain connections
% S: Degree of swelling
% Ext: Level of extractables
NC: solvent Butyl lactate
AC: solvent IPA Analysis:

The A-AR resin (ARNC 0.5%, ARNC 1% and ARAC 0.5%, ARAC 1%), following an immersion of 72 hours in methylcyclohexane, has excellent physical and chemical properties and qualities which allow it to withstand attack by the solvent. It has a low level of extractables.

What is claimed is:

1. A process for carrying out an impregnation on sheet gaskets at the engine block/cylinder head interface of engines, comprising the step of applying to said sheet gaskets, a composition comprising (i) an effective catalytic amount of at least one initiator salt (PI), and (2i) at least one polyorganosiloxane (POS) crosslinkable by a cationic route, said initiator salt (PI) is a borate of an onium of an element from groups 15 to 17 of the Periodic Classification or of an organometallic complex of an element from groups 4 to 10 of the Periodic Classification, —the cationic entity of said borate being selected from the group consisting of 1) onium cations of the formula (I):

 (I)

wherein:

A represents an element from groups 15 to 17,
R$^1$ represents a C$_6$–C$_{20}$ carbocyclic aryl radial or a C$_6$–C$_{20}$ heterocyclic aryl radical, said heterocyclic radical comprising nitrogen or sulphur as heteroelements;
R$^2$ represents R$^1$, a linear C$_1$–C$_{30}$ alkyl, a branched C$_1$–C$_{30}$ alkyl, a linear C$_1$–C$_{30}$ alkenyl radical or a branched C$_1$–C$_{30}$ alkenyl; the said R$^1$ and R$^2$ radicals optionally being substituted by a C$_1$–C$_{25}$ alkoxy, C$_1$–C$_{25}$ alkyl, nitro, chloro, bromo, cyano, carboxy, ester or mercapto group;
n is an integer ranging from 1 to v+1, v+1, v being the valency of the element a; and
m is an integer ranging from 0 to v+1, with n+m=v+1;

2) oxoisothiochromanium cations having the formula:

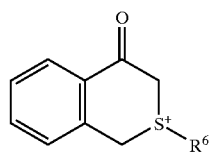

wherein the R$^6$ radical represents a linear C$_1$–C$_{20}$ alkyl radical or a branched C$_1$–C$_{20}$ alkyl radical;

3) sulphonium cations wherein the cationic entry comprises:

3.1) at least one polysulphonium species of formula III.1

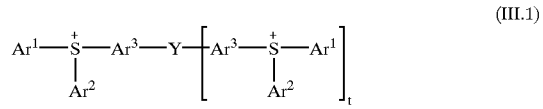 (III.1)

wherein the Ar$^1$ symbols, which can be identical to or different from one another, each represent a monovalent phenyl or naphthyl radical, optionally substituted with one or more radicals selected from the group consisting of a linear C$_1$–C$_{12}$ alkyl radical, a branched C$_1$–C$_{12}$ alkyl radical, a linear C$_1$–C$_{12}$ alkoxy radical, a branched C$_1$–C$_{12}$ alkoxy radical, a halogen atom, an —OH group, a —COOH group, a —COO— C$_1$–C$_{12}$ alkyl ester group, and a group of formula —Y$^4$—Ar$^2$, wherein:

the Ar$^2$ symbols, which can be identical to or different from one another or Ar$^1$, each represent a monovalent phenyl or naphthyl radical optionally substituted with one or more radicals selected from the group consisting of a linear or branched C$_1$–C$_{12}$ alkyl radical, a linear or branched C$_1$–C$_{12}$ alkoxy radical, a halogen atom, an —OH group, a —COOH group and a —COO— C$_1$–C$_{12}$ alkyl ester group;

the Ar$^3$ symbols, which can be identical to or different from one another, each represents a divalent phenylene or naphthylene radical optionally substituted with one or more radicals selected from the group consisting of a linear C$_1$–C$_{12}$ alkyl radical, a branched C$_1$–C$_{12}$ alkyl radical, a linear C$_1$–C$_{12}$ alkoxy radical, a branched C$_1$–C$_{12}$ alkoxy radical, a halogen atom, an —OH group, a —COOH group and a —COO— C$_1$–C$_{12}$ alkyl group;

t is an integer equal to 0 or 1, with the provision that:
when t=0, the Y symbol is then a Y$^1$ monovalent radical representing the group of formula:

Y$^1$: 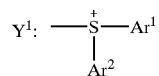

wherein the Ar$^1$ and Ar$^2$ symbols have the meanings given above, where t=1;
on the one hand, the Y symbol is then a divalent radical having the following meanings Y$^2$ to Y$^4$:
Y$^2$; a group of formula:

wherein the Ar$^2$ symbol has the meanings given above;
Y$^3$: a single valency bond;
Y$^4$: a divalent residue selected from the group consisting of:

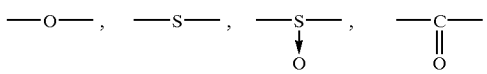

a linear $C_1$–$C_{12}$ alkylene residue, a branched $C_1$–$C_{12}$ alkylene residue and a residue of formula —Si(CH$_3$)$_2$O—;
on the other hand, solely in the case where the Y symbol represents $Y^3$ or $Y^4$, the $Ar^1$ and $Ar^2$ radicals optionally being connected to one another via a valency bond or —O— which is inserted between the carbon atoms, facing each other, situated on each aromatic ring in the ortho position with respect to the carbon atom directly bonded to the $S^-$ cation;

3.2) or at least one monosulphonium species having a single $S^+$ cationic centre per mole of cation and comprising a species of formula:

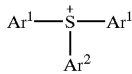   (III.2)

wherein $Ar^1$ and $Ar^2$ have the meanings given with respect to the formula (III.1), and are optionally connected directly between then according to a valency bond or —O—; and 4) organometallic cations of formula (IV):

$(L^1L^2L^3M)^{q+}$   (IV)

wherein:
M represents a metal from group 4 to 10;
$L^1$ represents a ligand bonded to the metal M via p electrons, which ligand is $\eta^3$-alkyl, $\eta^3$-cyclopentadienyl, $\eta^7$-cycloheptatrienyl ligands, optionally substituted $\eta^6$-benzene ligands and compounds having from 2 to 4 condensed rings, each ring being capable of contributing to the valency layer of the metal M via 3 to 8 p electrons;
$L^2$ represents a ligand bonded to the metal M via p elements, which ligand is chosen from $\eta^7$-cycloheptatrienyl ligands, optionally substituted $\eta^6$-benzene ligands and compounds having from 2 to 4 condensed rings, each ring being capable of contributing to the valency layer of the metal M via 6 to 7 p electrons,
$L^3$ represents from 0 to 3 identical or different ligands bonded to the metal M via a electrons, which ligand is CO or NO2$^+$; the total electronic charge q of the complex to which $L^1$, $L^2$ and $L^3$ and the ionic charge of the metal M contribute being positive and equal to 1 or 2; and
the anionic entity of the said borate having the formula:

$[BX_aR_b]^-$ wherein:
a and b are integers ranging from 0 to 3 for a and from 1 to 4 for b, with a+b=4;
the X symbols represent:
a halogen atom with a=0 to 3; or
an OH functional group with a=0 to 2;
the R symbols are identical or different and represent:
a phenyl radical substituted by at least one electron-withdrawing group, or by at least 2 halogen atoms, when the cationic entity is an onium of an element from groups 15 to 17;
a phenyl radical substituted by at least one electron-withdrawing element or group, when the cationic entity is an organometallic complex of an element from groups 4 to 10;
an aryl radical comprising at least two aromatic nucleic, optionally substituted by at least one electron-withdrawing element or group, whatever the cationic entity; and (2i) the polyorganosiloxanes comprises at least one monomer, one oligomer or one polymer which is:
a compound comprising at lest one organofunctional bridging group crosslinkage by the cationic route ($G_{fp}$) with a heterocyclic nature having one or more electron-donating atoms; or
a compound comprising at least one ethylenically unsaturated $G_{fp}$ group substituted by at least one electron-donating atom which increases the basicity of the p system; and (3i) the $G_{fp}5$ are present in a proportion expressed in equivalent per kg of polyorganosiloxane of at least 0.01; and wherein the sheet gaskets are further preimpregnated with at least one material for rendering leaktight formed by at least one crosslinked polymer, or are precoated with at least one layer of at least one elastomer.

2. A process according to claim 1, wherein the sheet gaskets are cylinder head gaskets.

3. A process according to claim 1, wherein the polyorganosiloxane is: a linear or substantially linear polyorganosiloxane composed of units of formula (V), terminated by units of formula (VI), or
a cyclic polyorgnaosiloxane composed of units of formula (V):

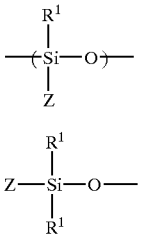

wherein:
the $R^1$ symbols are alike or different and represent:
either a linear or branched $C_1$–$C_6$ alkyl radical which is optionally substituted by one or more halogens,
an optionally substituted $C_5$–$C_8$ cycloalkyl radical, or
an aryl or aralkyl radical optionally substituted by halogens or alkoxys, and
the Z symbols are alike or different and represent:
either the $R^1$ radical,
or a $G_{fp}$ group corresponding to an epoxide or vinyl ether residue connected to the silicon via a divalent radical comprising from 2 to 20 carbon atoms optionally comprising a heteroatom,
at least one of the Z symbols corresponding to a $G_{fp}$ group.

4. A process according to claim 1, wherein the polyorganosiloxane has a viscosity expressed in mPa.s at 25° C. of between 200 and 3000.

5. A process according to claim 1, wherein the polyorganosiloxane has a viscosity expressed in mPa.s at 25° C. of between a value of between 3000 and 10,000.

6. A process according to claim 1 wherein the initiator salt comprises a borate anionic entity selected from the group consisting of:

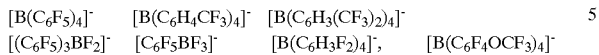

and their mixtures.

7. A processing according to claim 1, wherein the cationic entity of the initiator salt is;

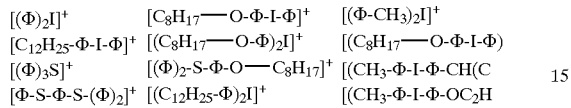

or their mixtures.

8. A process according to claim 1 wherein the cationic entry of the initiator said is:

($\eta^5$-cyclopentadienyl)($\eta^6$-toluene)Fe$^+$ ($\eta^5$-cyclopentadienyl)($\eta^6$-1-methyl-naphthalene)Fe$^+$ ($\eta^5$-cyclopentadienyl)($\eta^6$-cumene)Fe$^+$ bis($\eta^6$-mesitylene)Fe$^+$, or bis($\eta^6$-benzene)Cr$^+$.

9. A process according to claim 1, wherein the PI is an onium borate or a borate of organometallic cations having the formula:

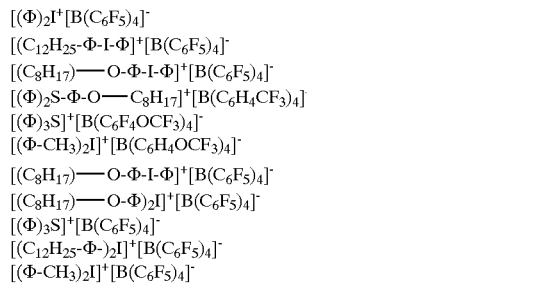

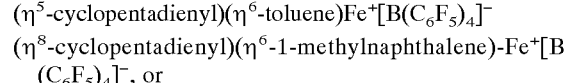

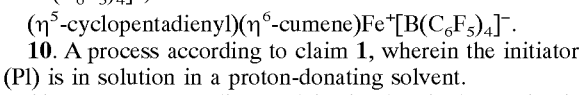

($\eta^5$-cyclopentadienyl)($\eta^6$-toluene)Fe$^+$[B(C$_6$F$_5$)$_4$]$^-$ ($\eta^8$-cyclopentadienyl)($\eta^6$-1-methylnaphthalene)-Fe$^+$[B(C$_6$F$_5$)$_4$]$^-$, or ($\eta^5$-cyclopentadienyl)($\eta^6$-cumene)Fe$^+$[B(C$_6$F$_5$)$_4$]$^-$.

10. A process according to claim 1, wherein the initiator (Pl) is in solution in a proton-donating solvent.

11. A process according to claim 1, wherein the coating is mono- or multilayer and exhibits a thickness of between 1 and 100 mm.

12. A process according to claim 1, wherein the composition is crosslinkable under the effect of heat.

13. A process according to claim 1, wherein M represents iron, manganese, chromium or cobalt.

* * * * *